United States Patent
Hatada et al.

(10) Patent No.: US 10,901,522 B2
(45) Date of Patent: Jan. 26, 2021

(54) INFORMATION PROCESSING SYSTEM, APPARATUS AND METHOD FOR MULTI USER SOFT KEYBOARDS

(71) Applicant: FUJITSU LIMITED, Kawasaki (JP)

(72) Inventors: Koki Hatada, Kawasaki (JP); Junichi Yura, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 209 days.

(21) Appl. No.: 15/938,402

(22) Filed: Mar. 28, 2018

(65) Prior Publication Data

US 2018/0284903 A1 Oct. 4, 2018

(30) Foreign Application Priority Data

Mar. 30, 2017 (JP) ................. 2017-068549

(51) Int. Cl.
*G06F 3/0488* (2013.01)
*G06F 3/0482* (2013.01)
(Continued)

(52) U.S. Cl.
CPC ............ *G06F 3/018* (2013.01); *G06F 1/1626* (2013.01); *G06F 1/1694* (2013.01);
(Continued)

(58) Field of Classification Search
CPC ...... G06F 17/276; G06F 3/018; G06F 1/1626; G06F 1/1694; G06F 1/1698; G06F 3/017; G06F 3/0231; G06F 3/0346; G06F 3/0482; G06F 3/0488; G06F 3/04886; G06F 3/1423
See application file for complete search history.

(56) References Cited

U.S. PATENT DOCUMENTS 10,139,990 B2 * 11/2018 Lee ..................... G06F 3/04883
2007/0294079 A1 * 12/2007 Ishikura .............. G06F 17/2223
704/3
(Continued)

FOREIGN PATENT DOCUMENTS

JP 2005-346179 12/2005
JP 2007-310784 11/2007
(Continued)

OTHER PUBLICATIONS

S. Izadi, et al. 2003. "Dynamo: a public interactive surface supporting the cooperative sharing and exchange of media". In Proc. Of UIST'03. ACM, 159-168.

*Primary Examiner* — Beau D Spratt
(74) *Attorney, Agent, or Firm* — Staas & Halsey LLP

(57) ABSTRACT

An information processing apparatus detects a focus on an input area of a display unit associated with a plurality of input units. The information processing apparatus receives sensor information output from a terminal held by a user. In a case where the terminal is identified by the received sensor information, the information processing apparatus associates the terminal with the input unit to be used to perform an input to the input area of the detected focus. Then, when acquiring the input to the focus from the input unit, the information processing apparatus transmits the acquired input to the terminal associated with the input unit.

11 Claims, 15 Drawing Sheets

(51) Int. Cl.
  *G06F 3/01* (2006.01)
  *G06F 3/14* (2006.01)
  *G06F 3/0346* (2013.01)
  *G06F 1/16* (2006.01)
  *G06F 3/023* (2006.01)

(52) U.S. Cl.
  CPC ............ *G06F 1/1698* (2013.01); *G06F 3/017* (2013.01); *G06F 3/0231* (2013.01); *G06F 3/0346* (2013.01); *G06F 3/0482* (2013.01); *G06F 3/0488* (2013.01); *G06F 3/04886* (2013.01); *G06F 3/1423* (2013.01); *G09G 2370/06* (2013.01); *G09G 2370/16* (2013.01); *G09G 2370/20* (2013.01); *G09G 2370/24* (2013.01)

(56) References Cited

U.S. PATENT DOCUMENTS

| | | | |
|---|---|---|---|
| 2009/0231281 A1* | 9/2009 | Whytock | G06F 3/04886 345/168 |
| 2010/0030549 A1* | 2/2010 | Lee | G06F 3/0412 704/4 |
| 2012/0209589 A1* | 8/2012 | Baek | H04W 4/14 704/3 |
| 2012/0284014 A1* | 11/2012 | Zivkovic | G06F 17/289 704/3 |
| 2013/0085747 A1* | 4/2013 | Li | G06F 17/2735 704/10 |
| 2014/0068497 A1* | 3/2014 | Park | G06F 40/274 715/780 |
| 2015/0346841 A1 | 12/2015 | Saratani | |
| 2016/0267200 A1* | 9/2016 | Guo | G06F 16/90328 |

FOREIGN PATENT DOCUMENTS

| | | |
|---|---|---|
| JP | 2010-181992 | 8/2010 |
| JP | 2015-228062 | 12/2015 |

\* cited by examiner

INFORMATION PROCESSING SYSTEM, APPARATUS AND METHOD FOR MULTI USER SOFT KEYBOARDS

CROSS-REFERENCE TO RELATED APPLICATION(S)

This application is based upon and claims the benefit of priority of the prior Japanese Patent Application No. 2017-068549, filed on Mar. 30, 2017, the entire contents of which are incorporated herein by reference.

FIELD

The embodiments discussed herein are related to an information processing system and the like.

BACKGROUND

In recent years, user interface (UI) technologies for digitizing a space are known. In such a space UI, a single window system is constructed using a large space such as a wall or a desk. Then, in the space UI, a digital sticky note that is a digitized sticky note is created and a handwritten character can be input to the created digital sticky note.

Further, as a related technology of the space UI, studies on input when a plurality of users uses a large screen have been carried out (see S. Izadi, et al. 2003. Dynamo: a public interactive surface supporting the cooperative sharing and exchange of media. In Proc. of UIST'03. ACM, 159-168, for example). In the studies, sets of a mouse and a keyboard are connected to the large screen, simultaneous input from a plurality of people is realized.

Further, as another related technology of the space UI, a technology of using a wall as a display is known. In the technology, a soft keyboard is displayed on the display of the wall and a text input is realized using the soft keyboard. A soft keyboard is also referred to as screen keyboard, and refers to software capable of displaying a planar keyboard on a screen and enabling a keyboard operation.

Patent Document 1: Japanese Laid-open Patent Publication No. 2007-310784
Patent Document 2: Japanese Laid-open Patent Publication No. 2010-181992
Patent Document 3: Japanese Laid-open Patent Publication No. 2015-228062
Patent Document 4: Japanese Laid-open Patent Publication No. 2005-346179

However, there is a problem that, when the plurality of users performs inputs on the common screen using the soft keyboard, it is difficult to personalize kana-kanji conversion for converting input kana characters into kanji characters to each of the plurality of users.

For example, the input method editor (IME) of the Japanese input system stores kanji characters having a high frequency of use, and preferentially displays the kanji characters having a high frequency of use at the top of conversion candidates when conducting kana-kanji conversion. That is, the kana-kanji conversion is personalized to each user who uses the Japanese input system.

However, in the space UI technologies, the handwritten character can be input to the digital sticky note, but it is difficult to input a character using a soft keyboard.

Further, in the related technology of the space UI, the sets of a mouse and a keyboard are connected to the screen to realize the simultaneous input from the plurality of people. However, since the relationship between the keyboard and the user is unknown, it is difficult to personalize the kana-kanji conversion to each of the plurality of users.

Further, another related technology of the space UI realizes the text input using the soft keyboard on the wall display. However, since the relationship between the soft keyboard and the user is unknown, it is difficult to personalize the kana-kanji conversion to each of the plurality of users.

Note that the above problem is not limited to the operation of the kana-kanji conversion but is also similarly caused in an input operation to the screen such as copy-and-paste.

SUMMARY

According to an aspect of an embodiment, an information processing system includes an information processing apparatus, a plurality of terminals, a display. The plurality of terminals are connected to the information processing apparatus. The display connected to the information processing apparatus is associated with a plurality of user interfaces. The information processing apparatus includes a detection unit, a reception unit, an association unit, an acquisition unit and a transmission unit. The detection unit detects a focus on an input area of the display. The reception unit receives sensor information output from a terminal held by a user. The association unit associates the terminal and the user interface to be used to perform an input to the input area of the focus detected by the detection unit in a case where the terminal is identified by the sensor information received by the reception unit. The acquisition unit acquires the input to the focus from the user interface. The transmission unit transmits the input acquired by the acquisition unit to the terminal associated with the user interface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the present invention is not limited by the embodiments.

[a] First Embodiment

Configuration of Information Processing System According to First Embodiment

Figure 1:
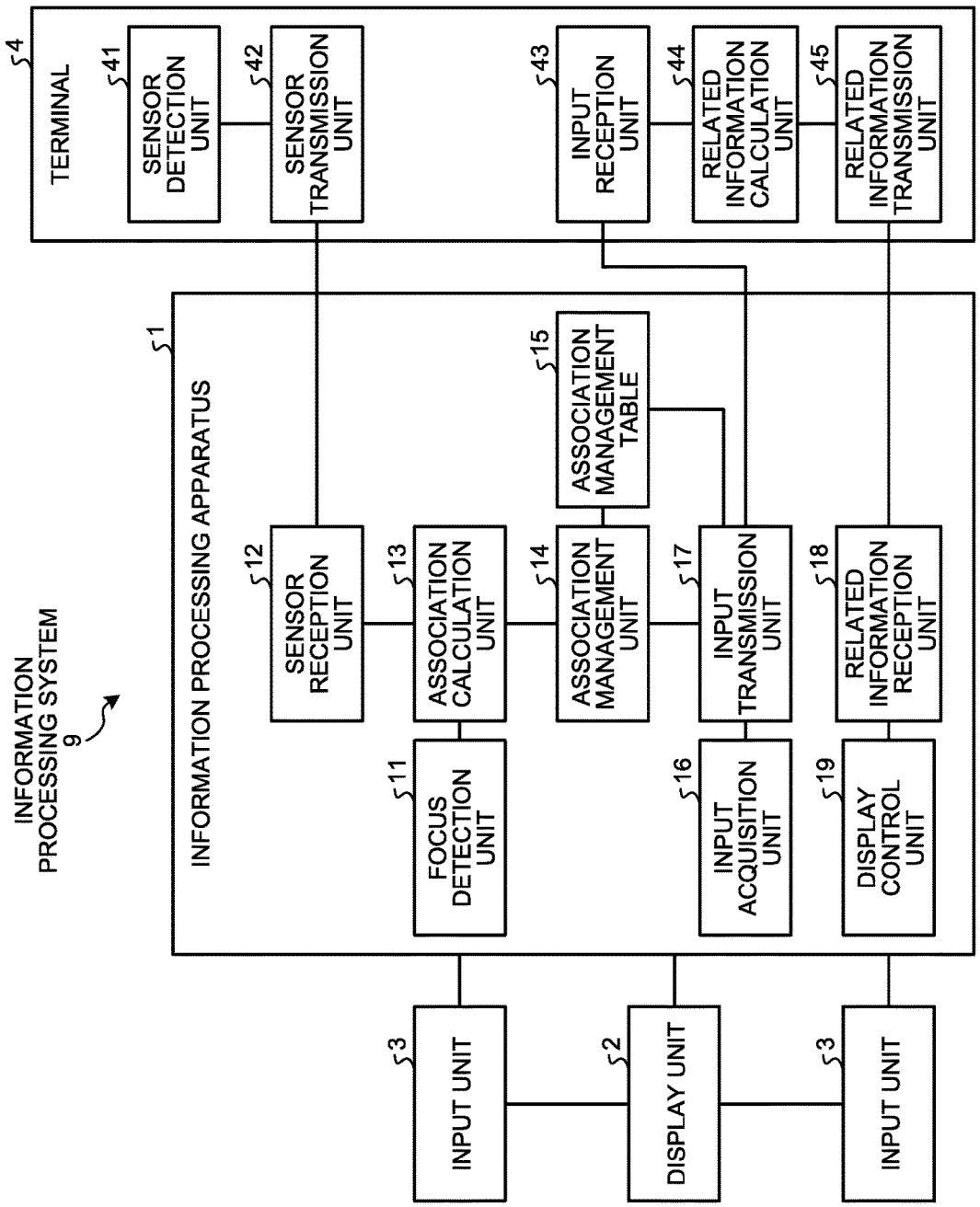
FIG. 1 is a functional block diagram illustrating a configuration of an information processing system according to a first embodiment.

FIG. 1 is a functional block diagram illustrating a configuration of an information processing system according to a first embodiment. In a user interface (UI) technology for digitizing a space, in a case of receiving sensor information of a terminal held by a user when detecting a focus on an input area of a screen, an information processing system 9 according to the first embodiment associates the terminal and a soft keyboard to be used to perform an input to the input area of the detected focus. Then, the information processing system 9 transmits the input by the soft keyboard to the terminal associated with the soft keyboard. Then, the information processing system 9 personalizes information related to an input for each user having a terminal, using information held in the terminal. The "focus" referred to here means a state of receiving an input or operation. Further, the "soft keyboard" means software capable of displaying a planar keyboard on a screen and enabling a keyboard operation. Further, the "information related to an input" referred to here means, in a case where the input operation is kana-kanji conversion, information of kana-kanji conversion candidates for kana characters indicated by the input, but the information is not limited thereto. Further, the "personalization" referred to here means, for example, "customization" or "optimization".

The information processing system 9 includes an information processing apparatus 1 and a terminal 4. The information processing apparatus 1 causes a wide space such as a wall or a desk to function as a single display unit 2. Further, the information processing apparatus 1 causes the display unit 2 to display a plurality of input units 3 at predetermined timing. The predetermined timing may be timing when the large space is caused to function as the display unit 2 or may be timing when the focus on the input area of the display unit 2 has been detected. The display unit 2 is a screen for displaying an image. The input unit 3 is a user interface (UI) for inputting characters, lines, and the like to the display unit 2, and is, for example, a soft keyboard.

The information processing apparatus 1 is connected with the terminal 4. The terminal 4 has a function including a predetermined sensor function, a display function, and a wireless communication function, and corresponds to a portable terminal device such as a smart phone, a mobile phone, a personal handy phone system (PHS), or a personal digital assistance (PDA). The predetermined sensor is, for example, an acceleration sensor or near field communication (NFC). However, the predetermined sensor is not limited thereto and any sensor can be employed as long as the sensor can identify the terminal 4. The wireless communication is, for example, wireless fidelity (WiFi) (registered trademark) or Bluetooth (registered trademark)-standard wireless communication. However, any wireless communication can be employed as long as the wireless communication is short-distance wireless communication. Note that FIG. 1 illustrates a case of one terminal 4. However, a plurality of the terminals 4 may be used.

The information processing apparatus 1 includes a focus detection unit 11, a sensor reception unit 12, an association calculation unit 13, an association management unit 14, an association management table 15, an input acquisition unit 16, an input transmission unit 17, a related information reception unit 18, and a display control unit 19.

The focus detection unit 11 detects the focus on the input area of the display unit 2. For example, the focus detection unit 11 detects the focus on the input area by an electronic pen. When detecting the focus, the focus detection unit 11 displays the input unit 3 in the vicinity of an area where the focus has been detected not to overlap with the input area. Although the focus detection unit 11 has been described to display the input unit 3 at the timing when the focus has been detected, the timing is not limited thereto, and the input unit 3 may have been already displayed when the focus detection unit 11 detects the focus.

The sensor reception unit 12 receives sensor information output from the terminal 4. For example, when using vibration of the terminal 4 for identification of the terminal 4, the sensor reception unit 12 receives sensor information of vibration from the terminal 4. In a case of using NFC for identification of the terminal 4, the sensor reception unit 12 receives sensor information of NFC from the terminal 4. In the case of using NFC for identification of the terminal 4, an NFC tag is supposed to be embedded not only in the terminal 4 but also in the space of the display unit 2.

In the case where the terminal 4 is identified with the sensor information received by the sensor reception unit 12, the association calculation unit 13 calculates correspondence between the terminal 4 and the input unit 3 to be used for performing an input to the input area. For example, the association calculation unit 13 calculates a time difference between a point of time when the focus detection unit 11 has detected the focus on the input area and a point of time when the sensor reception unit 12 has received the sensor information. In a case where the calculated time difference falls within a predetermined time difference range, the association calculation unit 13 associates the terminal 4 that has output the sensor information and the input unit 3 in the vicinity of the focused input area. The predetermined time difference range is, for example, 5 seconds or 10 seconds. However, any range is applicable as long as the range indicates that the point of time when the sensor information has been received is immediately after the point of time when the focus on the input area has been detected.

The association management unit 14 manages the correspondence calculated by the association calculation unit 13. For example, in a case where reception of the sensor information by the sensor reception unit 12 is for the first time, the association management unit 14 stores the association between the input unit 3 and the terminal 4 calculated by the association calculation unit 13 to the association management table 15. Further, in a case where reception of the sensor information by the sensor reception unit 12 is for the second time, the association management unit 14 cancels the association between the input unit 3 and the terminal 4 stored in the association management table 15.

Figure 2:
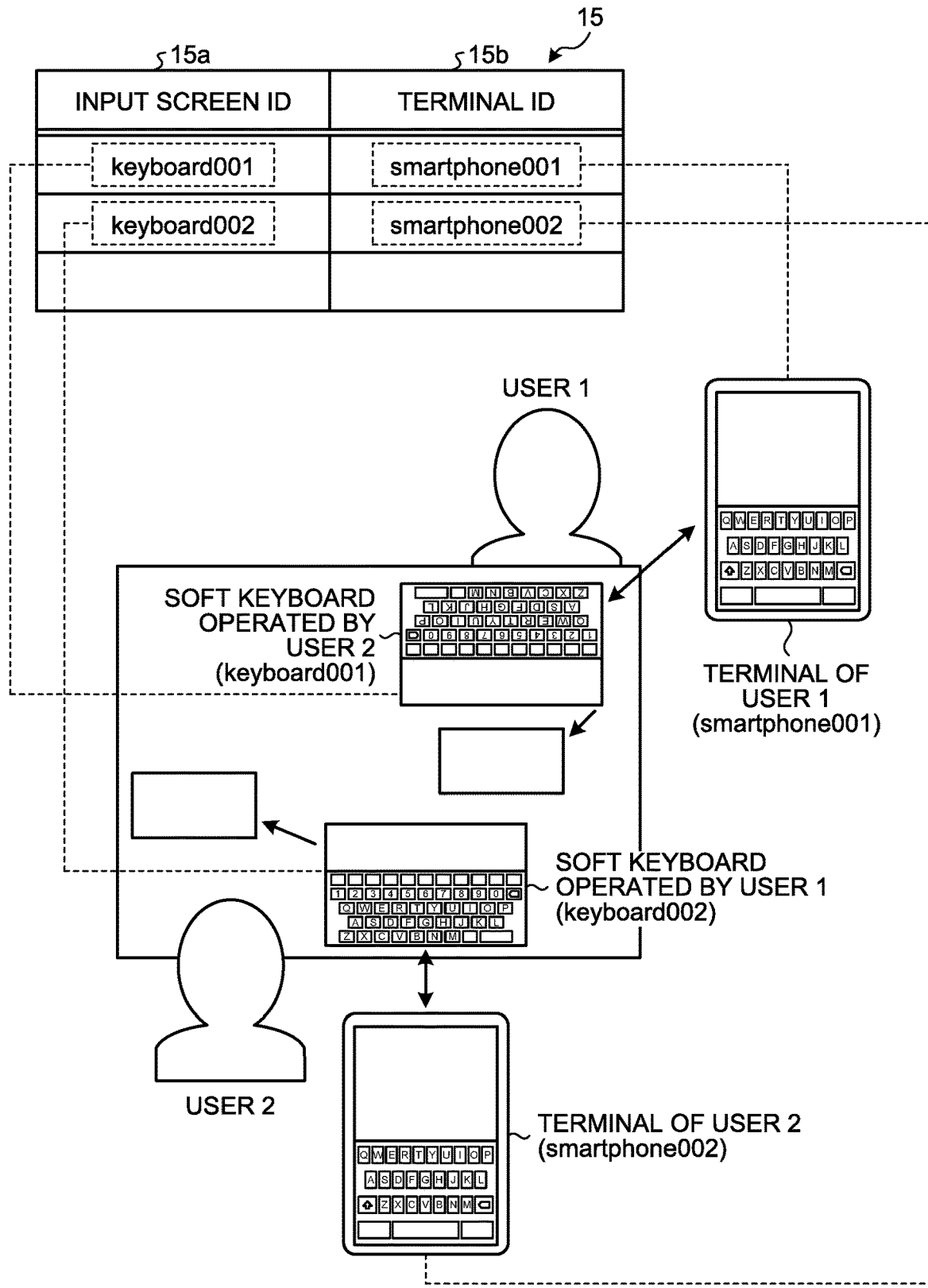
FIG. 2 is a diagram illustrating an example of a data structure of an association management table according to the first embodiment.

Here, an example of a data structure of the association management table 15 will be described with reference to FIG. 2. FIG. 2 is a diagram illustrating an example of the data structure of the association management table according to the first embodiment. As illustrated in FIG. 2, the association management table 15 stores an input screen identifier (ID) 15*a* and a terminal ID 15*b* in association with each other. The input screen ID 15*a* is, for example, an ID of the input unit 3 operated by the user having the terminal 4 indicated by the terminal ID 15*b*. The terminal ID 15*b* is an ID of the terminal 4. As an example, in a case where the input screen ID 15*a* is "keyboard001", "smartphone001" is stored as the terminal ID 15*b*.

The input acquisition unit 16 acquires an input to the focus from the input unit 3. For example, in a case where related information related to an input described below is kana-kanji conversion candidates, the input acquisition unit 16 acquires kana characters indicated by the input from the input unit 3.

The input transmission unit 17 transmits the input acquired by the input acquisition unit 16 to the terminal 4 associated with the input unit 3. For example, the input transmission unit 17 refers to the association management table 15 and reads the terminal ID 15*b* associated with the input screen ID 15*a* of the input unit 3 to which the input has been input. The input transmission unit 17 transmits the kana characters indicated by the input acquired by the input acquisition unit 16 to the terminal 4 indicated by the read terminal ID 15*b*.

The related information reception unit 18 receives the related information related to the input from the terminal 4. For example, the related information reception unit 18 receives the kana-kanji conversion candidates for the kana characters indicated by the input from the terminal 4 that has transmitted the input.

The display control unit 19 displays the related information related to the input received by the related information reception unit 18, on the display unit 2 in the vicinity of the input unit 3. For example, the display control unit 19 displays the kana-kanji conversion candidates for the kana characters indicated by the input received by the related information reception unit 18, on the right side of the vicinity of the input unit 3 in the display unit 2 not to overlap with the input unit 3. Further, when a kanji character is selected from the kana-kanji conversion candidates using the input unit 3, the display control unit 19 inserts the selected kanji to a focused position.

The terminal 4 includes a sensor detection unit 41, a sensor transmission unit 42, an input reception unit 43, a related information calculation unit 44, and a related information transmission unit 45.

The sensor detection unit 41 detects the sensor information of the terminal 4. For example, in a case of using vibration of the terminal 4 for identification of the terminal 4, the sensor detection unit 41 detects sensor information of an acceleration sensor. Further, in a case of using NFC for identification of the terminal 4, the sensor detection unit 41 detects sensor information of an NFC tag.

The sensor transmission unit 42 transmits the sensor information detected by the sensor detection unit 41 to the information processing apparatus 1.

The input reception unit 43 receives an input from the information processing apparatus 1. For example, the input reception unit 43 receives kana characters indicated by the input from the information processing apparatus 1.

The related information calculation unit 44 calculates the related information related to the input received by the input reception unit 43. For example, the related information calculation unit 44 reads kana-kanji conversion candidates for the kana characters indicated by input from the information held in the terminal 4, and rearranges the kanji characters included in the read kana-kanji conversion candidates in descending order of frequency of use of the user.

The related information transmission unit 45 transmits the related information related to the input calculated by the related information calculation unit 44 to the information processing apparatus 1. For example, the related information transmission unit 45 transmits the kana-kanji conversion candidates for the kana characters indicated by the input and rearranged by the related information calculation unit 44 to the information processing apparatus 1.

Example of Association Processing

Figure 3:
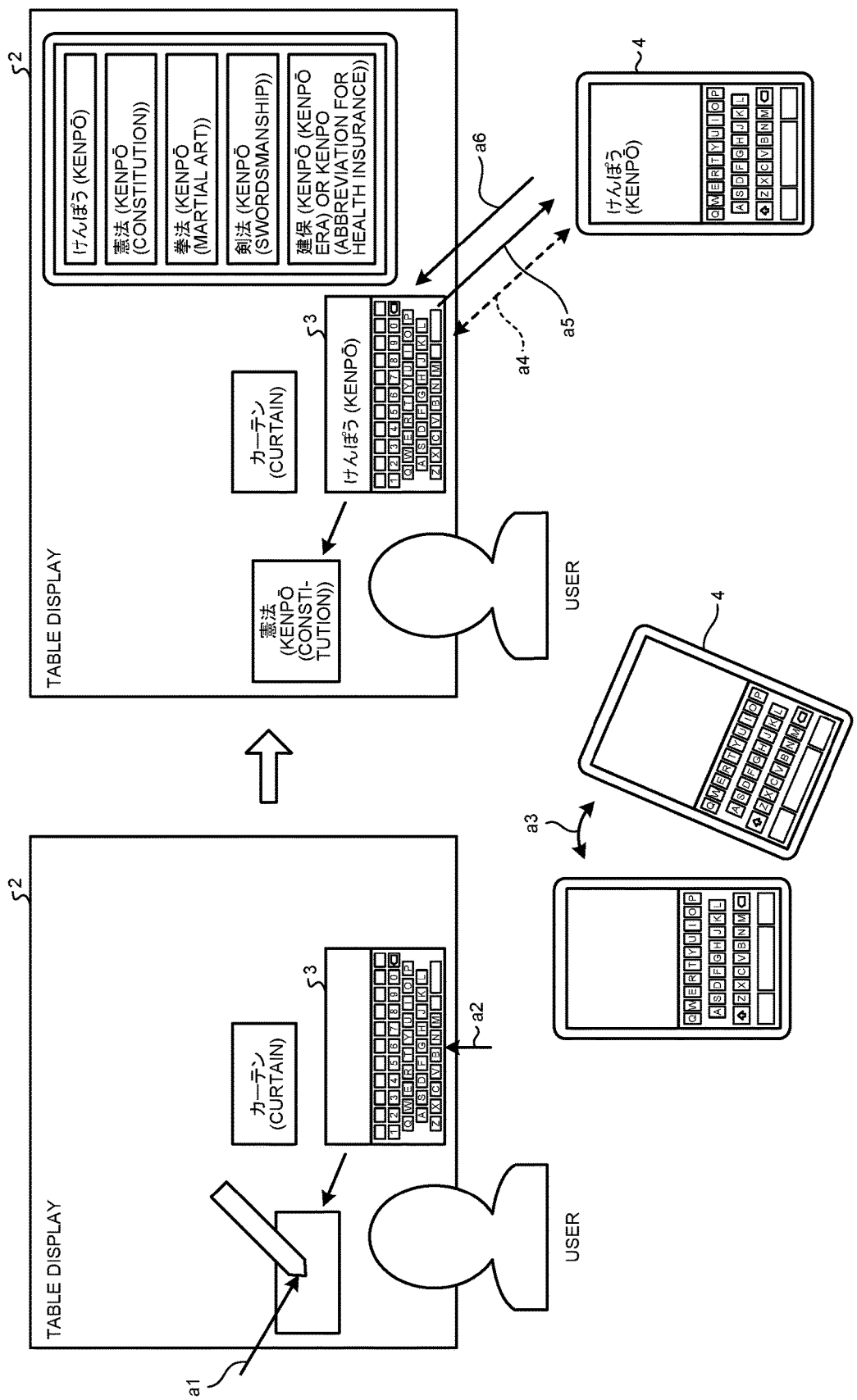
FIG. 3 is a diagram illustrating an example of association processing according to the first embodiment.

FIG. 3 is a diagram illustrating an example of association processing according to the first embodiment. Note that, in FIG. 3, the association calculation unit 13 associates the terminal 4 that has output the sensor information with the input unit 3, using the sensor information of the acceleration sensor. Assuming that the input unit 3 is a soft keyboard. Further, in FIG. 3, FIG. 4, FIG. 7, FIG. 8, FIG. 9, FIG. 10, Japanese term "けんぽう" is kana characters. "Kenpō" is pronunciation of "けんぽう". Japanese terms "憲法", "拳法", "剣法", "建保", are kanji. "Kenpō" is pronunciation of "憲法", "拳法", "剣法", "建保". The meaning of Japanese term "憲法" is "constitution" in English. The meaning of Japanese term "拳法" is "martial art" in English. The meaning of Japanese term "剣法" is "swordsmanship" in English. The meaning of Japanese term "建保" is "abbreviation for health insurance" in English.

The user focuses on the input area of the display unit 2 with an electronic pen (*a*1). The input area referred to here is, for example, a digital sticky note generated in advance. Then, in the information processing apparatus 1, the focus detection unit 11 detects the focus on the input area of the display unit 2. Then, the focus detection unit 11 displays the input unit 3 in the vicinity of the position where the focus has been detected not to overlap with the input area (*a*2).

Immediately after the input area is focused, the user shakes the terminal 4 (*a*3). Then, in the information processing apparatus 1, the sensor reception unit 12 receives the terminal ID of the terminal 4 and the sensor information of vibration from the terminal 4. Then, the association calculation unit 13 associates the terminal 4 having the received terminal ID with the input unit 3 displayed in the vicinity of the position where the focus has been detected (*a*4).

Next, the user inputs kana characters for the focus using the input unit 3. Here, assuming that the user inputs "けんぽう (Kenpō)". Then, in the information processing apparatus 1, the input acquisition unit 16 acquires the kana characters "けんぽう (Kenpō)" input from the input unit 3. Then, the input transmission unit 17 transmits the acquired kana characters "けんぽう (Kenpō)" to the terminal 4 having the terminal ID associated with the input unit 3 (*a*5).

In the terminal 4, the input reception unit 43 receives the kana characters "けんぽう (Kenpō)" transmitted from the information processing apparatus 1. Then, the related information calculation unit 44 calculates the related information related to the input. Here, the related information calculation unit 44 calculates kana-kanji conversion candidates for the kana characters "けんぽう (Kenpō)" indicated by the input. That is, the related information calculation unit 44 calculates kana-kanji conversion candidates peculiar to the terminal 4. As an example, kana-kanji conversion candidates "けんぽう (Kenpō), 憲法 (Kenpō (constitution)), 拳法 (Kenpō (martial art)), 剣法 (Kenpō (swordsmanship)), 建保 (Kenpō (Kenpō era) or Kenpo (abbreviation for health insurance))" are calculated in descending order of the frequency of use of the user. Then, the related information transmission unit 45 transmits the calculated kana-kanji conversion candidates to the information processing apparatus 1.

In the information processing apparatus 1, the related information reception unit 18 receives the kana-kanji conversion candidates transmitted from the terminal 4, and the display control unit 19 displays the received kana-kanji conversion candidates in the vicinity of the input unit 3 not to overlap with the input unit 3 (*a*6). With the processing, the information processing apparatus 1 can optimize (personalize) the conversion candidates for the kana-kanji conversion for the user having the terminal 4 by associating the input unit 3 and the terminal 4 using the sensor of the terminal 4.

Another Example of Association Processing

Figure 4:
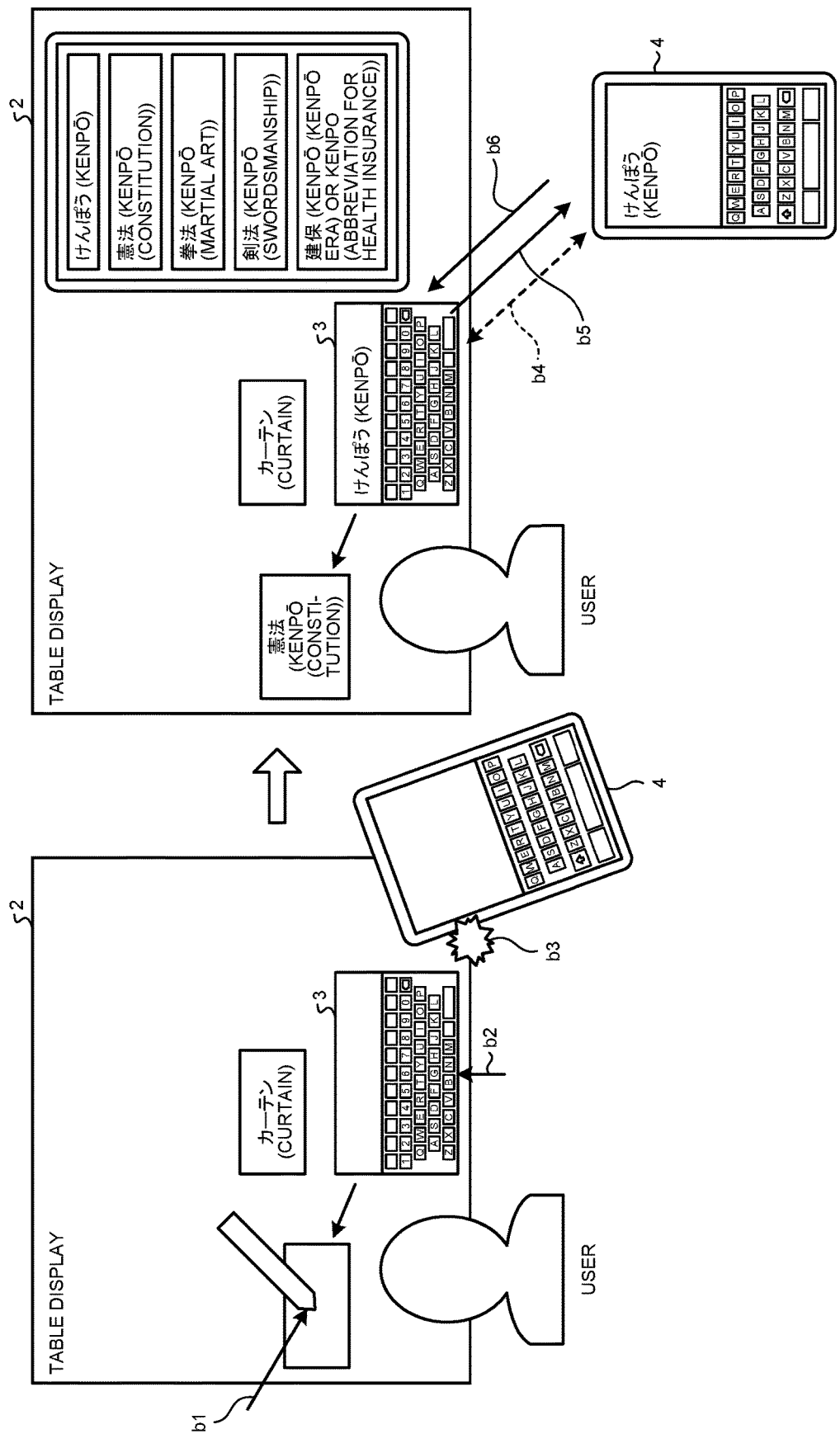
FIG. 4 is a diagram illustrating another example of the association processing according to the first embodiment.

FIG. 4 is a diagram illustrating another example of the association processing according to the first embodiment. Note that, in FIG. 4, the association calculation unit 13 associates the terminal 4 that has output the sensor information with the input unit 3, using the sensor information of the NFC. Assuming that the input unit 3 is a soft keyboard.

The user focuses on the input area of the display unit 2 with an electronic pen (*b*1). The input area referred to here is, for example, a digital sticky note generated in advance. Then, in the information processing apparatus 1, the focus detection unit 11 detects the focus on the input area of the display unit 2. Then, the focus detection unit 11 displays the input unit 3 in the vicinity of the position where the focus has been detected not to overlap with the input area (*b*2).

Immediately after the input area is focused, the user brings the terminal 4 in contact with or close to the display unit 2 (*b*3). Then, in the information processing apparatus 1, the sensor reception unit 12 receives the terminal ID of the terminal 4 and the sensor information of the NFC from the terminal 4. Then, the association calculation unit 13 associates the terminal 4 having the received terminal ID with the input unit 3 displayed in the vicinity of the position where the focus has been detected (*b*4).

Next, the user inputs kana characters to the input area using the input unit 3. Here, assuming that the user inputs "けんぽう (Kenpō)". Then, in the information processing apparatus 1, the input acquisition unit 16 acquires the kana characters "けんぽう (Kenpō)" input from the input unit 3. Then, the input transmission unit 17 transmits the acquired kana characters "けんぽう (Kenpō)" to the terminal 4 having the terminal ID associated with the input unit 3 (*b*5).

In the terminal 4, the input reception unit 43 receives the kana characters "けんぽう (Kenpō)" transmitted from the information processing apparatus 1. Then, the related information calculation unit 44 calculates the related information related to the input. Here, the related information calculation unit 44 calculates kana-kanji conversion candidates for the kana characters "けんぽう (Kenpō)" indicated by the input. That is, the related information calculation unit 44 calculates kana-kanji conversion candidates peculiar to the terminal 4. As an example, kana-kanji conversion candidates "けんぽう (Kenpō), 憲法 (Kenpō) (constitution)), 拳法 (Kenpō (martial art)), 剣法 (Kenpō (swordsmanship)), 建保 (Kenpō (Kenpō era) or Kenpo (abbreviation for health insurance))" are calculated in descending order of the frequency of use of the user. Then, the related information transmission unit 45 transmits the calculated kana-kanji conversion candidates to the information processing apparatus 1.

In the information processing apparatus 1, the related information reception unit 18 receives the kana-kanji conversion candidates transmitted from the terminal 4, and the display control unit 19 displays the received kana-kanji conversion candidates in the vicinity of the input unit 3 not to overlap with the input unit 3 (*b*6). With the processing, the information processing apparatus 1 can optimize (personalize) the conversion candidates for the kana-kanji conversion for the user having the terminal 4 by associating the input unit 3 and the terminal 4 using the sensor of the terminal 4.

Example of Flowchart of Information Processing

Figure 5:
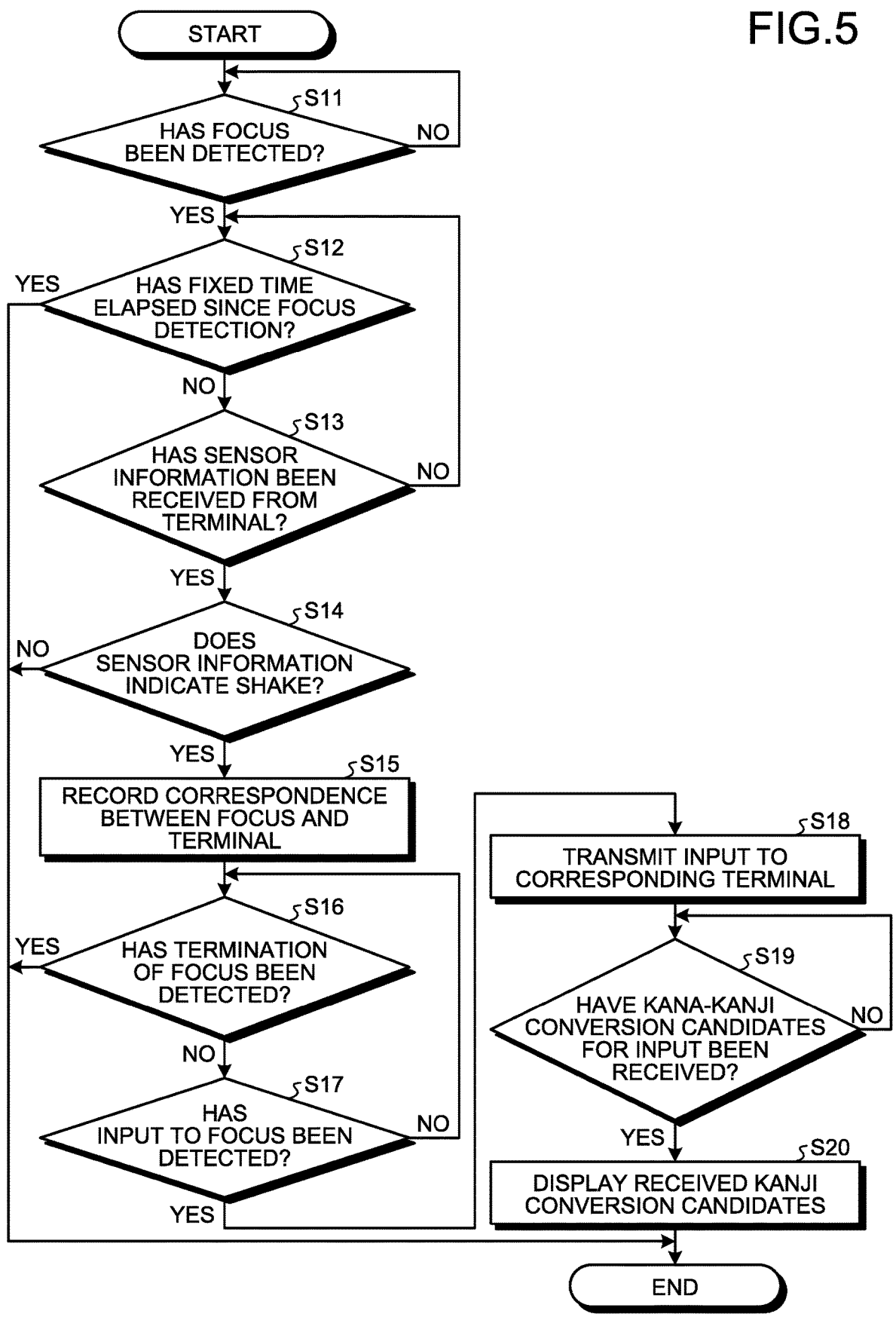
FIG. 5 is a diagram illustrating an example of a flowchart of information processing according to the first embodiment.

FIG. 5 is a diagram illustrating an example of a flowchart of information processing according to the first embodiment. Note that, in FIG. 5, a case of inputting kana characters as an object to be input and performing an input operation of kana-kanji conversion will be described. Further, the association calculation unit 13 associates the terminal 4 that has output the sensor information with the input unit 3, using the sensor information of the acceleration sensor.

As illustrated in FIG. 5, the focus detection unit 11 determines whether the focus on the input area of the display unit 2 has been detected (Step S11). When it is determined that the focus has not been detected (Step S11; No), the focus detection unit 11 repeats the determination processing until the focus is detected.

On the other hand, when it is determined that the focus has been detected (Step S11; Yes), the focus detection unit 11 displays the input unit 3 in the vicinity of the position where the focus has been detected. Then, the focus detection unit 11 determines whether a fixed time has elapsed since the focus detection (Step S12). When it is determined that the fixed time has elapsed since the focus detection (Step S12; Yes), the information processing apparatus 1 terminates the information processing.

On the other hand, when it is determined that the fixed time has not elapsed since the focus detection (Step S12; No), the sensor reception unit 12 determines whether the sensor information has been received from the terminal 4 (Step S13). When it is determined that the sensor information has not been received from the terminal 4 (Step S13; No), the sensor reception unit 12 is moved onto Step S12 in order to repeat the determination processing until the fixed time elapses after the focus detection.

On the other hand, when it is determined that the sensor information has been received from the terminal 4 (Step S13; Yes), the sensor reception unit 12 determines whether the sensor information indicates a shake (vibration) (Step S14). When it is determined that the sensor information does not indicate a shake (vibration) (Step S14; No), the information processing apparatus 1 terminates the information processing.

On the other hand, when it is determined that the sensor information indicates a shake (vibration) (Step S14; Yes), the association calculation unit 13 calculates the correspondence between the focus and the terminal 4. Then, the association management unit 14 records the calculated correspondence to the association management table 15 (Step S15). For example, the association calculation unit 13 associates the terminal 4 that has output the sensor information with the input unit 3 in the vicinity of the focused input area. Then, the association management unit 14 records the correspondence between the input unit 3 and the terminal 4, which are associated with each other, to the association management table 15. That is, the association management unit 14 records the correspondence between the input screen ID 15*a* of the input unit 3 and the terminal ID 15*b* of the terminal 4 to the association management table 15.

Next, the focus detection unit 11 determines whether termination of the focus has been detected (Step S16). When it is determined that the termination of the focus has been detected (Step S16; Yes), the information processing apparatus 1 terminates the information processing.

On the other hand, when it is determined that the termination of the focus has not been detected (Step S16; No), the input acquisition unit 16 determines whether the input to the focus has been detected (Step S17). When it is determined that the input to the focus has not been detected (Step S17; No), the input acquisition unit 16 is moved onto Step S16 in order to repeat the determination processing until the input to the focus is detected.

On the other hand, when it is determined that the input to the focus has been detected (Step S17; Yes), the input transmission unit 17 transmits the detected and acquired input to the corresponding terminal 4 (Step S18). For example, the input transmission unit 17 refers to the association management table 15 and reads the terminal ID 15*b* associated with the input screen ID 15*a* of the input unit 3. Then, the input transmission unit 17 transmits the input to the terminal 4 indicated by the terminal ID 15*b*. Here, the input is kana characters to be converted into kanji characters.

Next, the related information reception unit 18 determines whether the kana-kanji conversion candidates for the input have been received (Step S19). When it is determined that the kana-kanji conversion candidates for the input have not been received (Step S19; No), the related information reception unit 18 is moved onto Step S19 in order to repeat the determination processing until the kana-kanji conversion candidates for the input are received.

On the other hand, when it is determined that the kana-kanji conversion candidates for the input have been received (Step S19; Yes), the display control unit 19 displays the received kana-kanji conversion candidates on the display unit 2 in the vicinity of the input unit 3 (Step S20). After that, the display control unit 19 inserts the kanji characters selected from the displayed kana-kanji conversion candidates into the position where the focus on the input area has been detected, for example. Then, the information processing apparatus 1 terminates the information processing.

With the processing, the information processing apparatus 1 can optimize (personalize) the conversion candidates for the kana-kanji conversion for the user having the terminal 4 by associating the input unit 3 and the terminal 4 using the sensor of the terminal 4.

Note that, in the first embodiment, the case in which the information processing apparatus 1 performs the input operation to convert kana characters into kanji characters, having the kana characters as the object to be input has been described. However, the embodiment is not limited to the case, and the information processing apparatus 1 may perform an input operation of copy-and-paste, having copy information as the object to be input. Here, a flowchart in the case of performing the copy-and-paste input operation will be described with reference to FIG. 6.

Example of Flowchart of Information Processing

Figure 6:
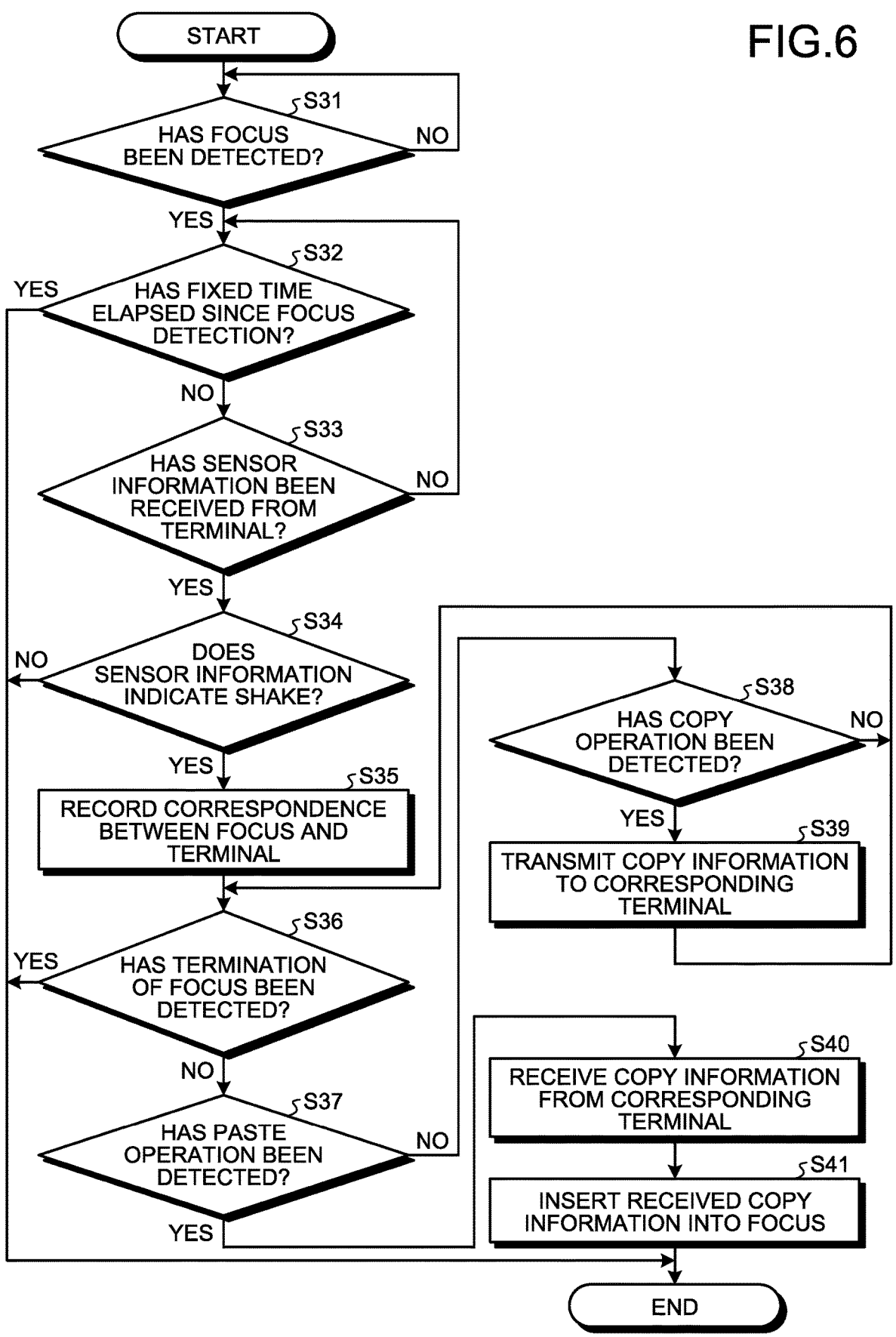
FIG. 6 is a diagram illustrating another example of a flowchart of the information processing according to the first embodiment.

FIG. 6 is a diagram illustrating another example of a flowchart of the information processing according to the first embodiment. Note that the association calculation unit 13 associates the terminal 4 that has output the sensor information with the input unit 3, using the sensor information of the acceleration sensor.

As illustrated in FIG. 6, the focus detection unit 11 determines whether the focus on the input area of the display unit 2 has been detected (Step S31). When it is determined that the focus has not been detected (Step S31; No), the focus detection unit 11 repeats the determination processing until the focus is detected.

On the other hand, when it is determined that the focus has been detected (Step S31; Yes), the focus detection unit 11 displays the input unit 3 in the vicinity of the position where the focus has been detected. Then, the focus detection unit 11 determines whether a fixed time has elapsed since the focus detection (Step S32). When it is determined that the fixed time has elapsed since the focus detection (Step S32; Yes), the information processing apparatus 1 terminates the information processing.

On the other hand, when it is determined that the fixed time has not elapsed since the focus detection (Step S32; No), the sensor reception unit 12 determines whether the sensor information has been received from the terminal (Step S33). When it is determined that the sensor information has not been received from the terminal 4 (Step S33; No), the sensor reception unit 12 is moved onto Step S32 in order to repeat the determination processing until the fixed time elapses after the focus detection.

On the other hand, when it is determined that the sensor information has been received from the terminal 4 (Step S33; Yes), the sensor reception unit 12 determines whether the sensor information indicates a shake (vibration) (Step S34). When it is determined that the sensor information does not indicate a shake (vibration) (Step S34; No), the information processing apparatus 1 terminates the information processing.

On the other hand, when it is determined that the sensor information indicates a shake (vibration) (Step S34; Yes), the association calculation unit 13 calculates the correspondence between the focus and the terminal 4. Then, the association management unit 14 records the calculated correspondence to the association management table 15 (Step S35). That is, the association management unit 14 records the correspondence between the input screen ID 15*a* of the input unit 3 and the terminal ID 15*b* of the terminal 4 to the association management table 15.

Next, the focus detection unit 11 determines whether termination of the focus has been detected (Step S36). When it is determined that the termination of the focus has been detected (Step S36; Yes), the information processing apparatus 1 terminates the information processing.

On the other hand, when it is determined that the termination of the focus has not been detected (Step S36; No), the input acquisition unit 16 determines whether a paste operation has been detected (Step S37). On the other hand, when it is determined that the paste operation has not been detected (Step S37; No), the input acquisition unit 16 determines whether a copy operation has been detected (Step S38). On the other hand, when it is determined that the paste operation has been detected (Step S37; Yes), the input acquisition unit 16 proceeds to Step S40.

When it is determined that the copy operation has not been detected (Step S38; No), the input acquisition unit 16 is moved onto Step S36 in order to repeat the determination processing until the copy operation is detected.

On the other hand, when it is determined that the copy operation has been detected (Step S38; Yes), the input transmission unit 17 transmits the detected and acquired copy information to the corresponding terminal 4 (Step S39). For example, the input transmission unit 17 refers to the association management table 15 and reads the terminal ID 15*b* associated with the input screen ID 15*a* of the input unit 3. Then, the input transmission unit 17 transmits the input to the terminal 4 indicated by the terminal ID 15*b*. Then, the input transmission unit 17 is moved onto Step S36.

In Step S40, the related information reception unit 18 receives the copy information from the corresponding terminal 4 (Step S40). Then, the display control unit 19 inserts the received copy information into the focused position of the input area (Step S41). Then, the information processing apparatus 1 terminates the information processing.

With the processing, the information processing apparatus 1 can paste the copy information specified by the user having the terminal 4 to the position specified by the user by associating the input unit 3 and the terminal 4 using the sensor of the terminal 4. That is, the information processing apparatus 1 can optimize (personalize) the input operation for the user having the terminal 4.

Hereinafter, modifications of the information processing system 9 according to the first embodiment will be described with reference to FIGS. 7 to 10.

A first modification will be described. In the first embodiment, the description that the information processing apparatus 1 prompts, concerning kana-kanji conversion, the user to input kana characters or the like using the input unit 3 after associating the input unit 3 and the terminal 4 has been given. However, the embodiment is not limited thereto, and the information processing apparatus 1 may prompt the user to input kana characters or the like using a device connected to the terminal 4 in place of the input unit 3 after associating the input unit 3 and the terminal 4. Here, a case of prompting a user to input kana characters or the like using a device connected to a terminal 4 in place of the input unit 3 after associating the input unit 3 and the terminal 4 will be described with reference to FIG. 7.

Figure 7:
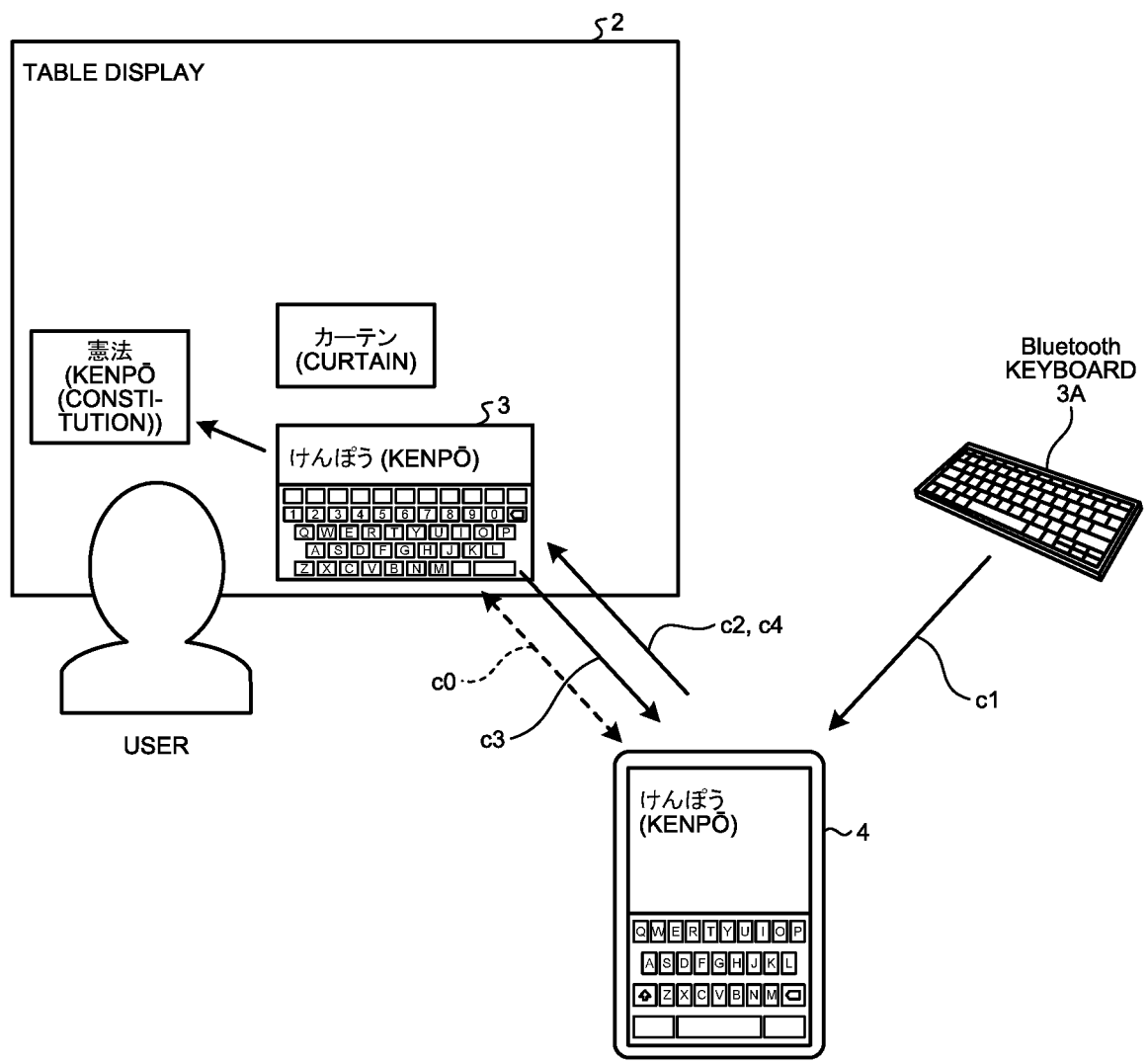
FIG. 7 is a diagram illustrating a first modification of an information processing system according to the first embodiment.

FIG. 7 is a diagram illustrating a first modification of an information processing system according to the first embodiment. In FIG. 7, the terminal 4 is connected with a keyboard 3A by Bluetooth.

As illustrated in FIG. 7, an information processing apparatus 1 associates the input unit 3 and the terminal 4 (*c*0). Next, the user inputs kana characters for a focus using the keyboard 3A (*c*1). Here, assuming that the user inputs "けんぽう (Kenpō)".

Then, the terminal 4 transmits the input kana characters to the input unit 3 (*c*2).

Then, the information processing apparatus 1 acquires and transmits the input kana characters "けんぽう (Kenpō)" to the terminal 4 having a terminal ID associated with the input unit 3 (*c*3).

The terminal 4 receives the kana characters "けんぽう (Kenpō)" transmitted from the information processing apparatus 1, and calculates related information related to the input. Here, the terminal 4 calculates kana-kanji conversion candidates for the kana characters "けんぽう (Kenpō)" indicated by the input. That is, the terminal 4 calculates kana-kanji conversion candidates peculiar to the terminal 4. Then, the terminal 4 transmits the calculated kana-kanji conversion candidates to the information processing apparatus 1 (*c*4).

The information processing apparatus 1 receives the kana-kanji conversion candidates transmitted from the terminal 4 and displays the received kana-kanji conversion candidates in the vicinity of the input unit 3. With the processing, the information processing apparatus 1 can optimize (personalize) the conversion candidates for the kana-kanji conversion for the user having the terminal 4 by associating the input unit 3 and the terminal 4 using the keyboard 3A in place of the input unit 3.

A second modification will be described. In FIG. 7, the information processing apparatus 1 has prompted, concerning kana-kanji conversion, the user to input kana characters from the keyboard 3A as a device connected to the terminal 4 in place of the input unit 3 after associating the input unit 3 and the terminal 4 However, the information processing apparatus 1 may allow not only the keyboard 3A but also a voice character input device 3B to input kana characters as the device connected to the terminal 4. Here, a case of causing the voice character input device 3B to input kana characters as a device connected to a terminal 4 in place of the input unit 3 after associating the input unit 3 and the terminal 4 will be described with reference to FIG. 8.

Figure 8:
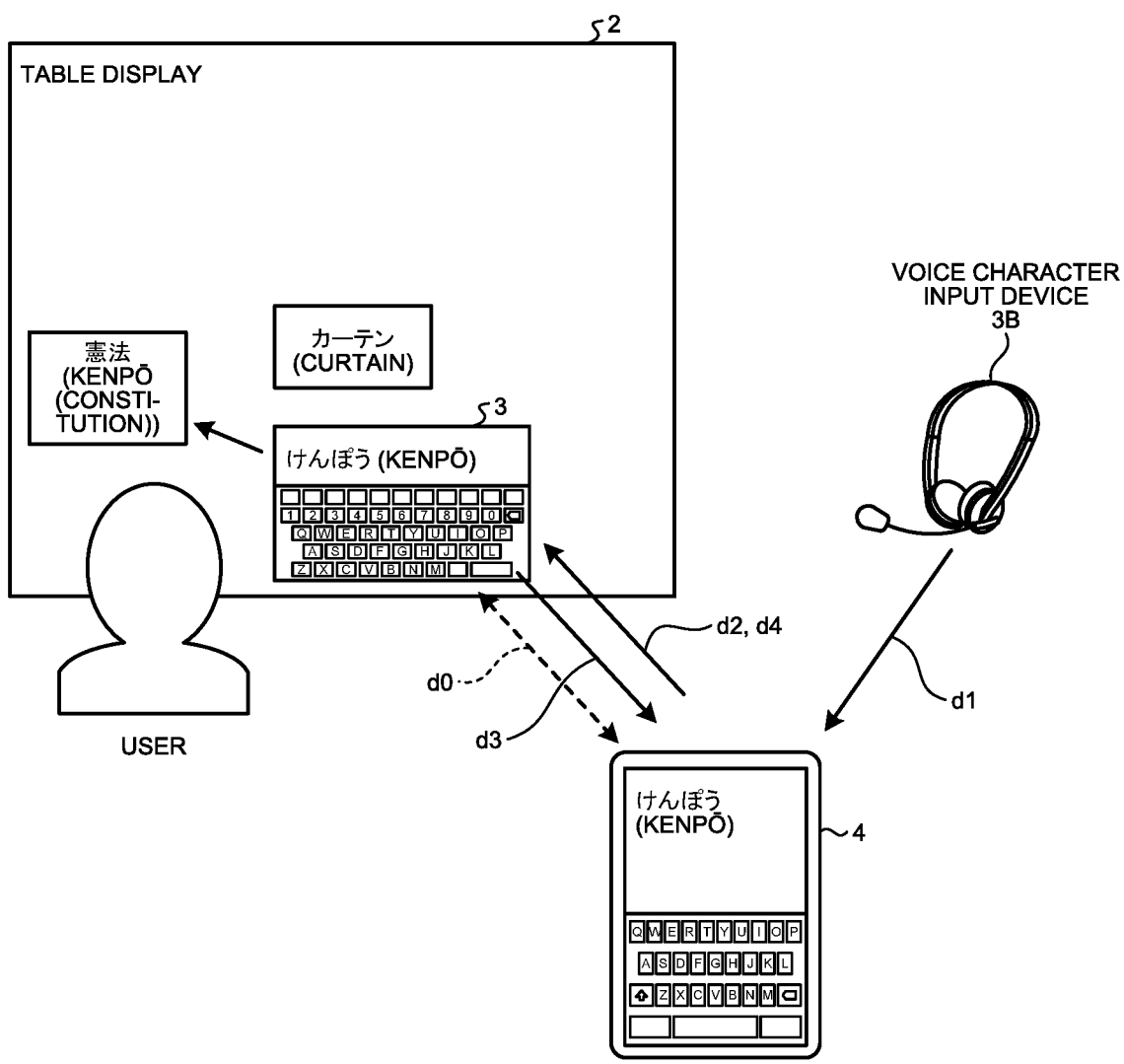
FIG. 8 is a diagram illustrating a second modification of an information processing system according to the first embodiment.

FIG. 8 is a diagram illustrating a second modification of an information processing system according to the first embodiment. In FIG. 8, the terminal 4 is connected with the voice character input device 3B.

As illustrated in FIG. 8, an information processing apparatus 1 associates the input unit 3 and the terminal 4 (*d*0). Next, the user inputs kana characters for a focus using the voice character input device 3B (*d*1). Here, assuming that a user inputs "けんぽう (Kenpō)" with a voice.

Then, the terminal 4 transmits the input kana characters to the input unit 3 (*d*2).

Then, the information processing apparatus 1 acquires and transmits the input kana characters "けんぽう (Kenpō)" to the terminal 4 having a terminal ID associated with the input unit 3 (*d*3).

The terminal 4 receives the kana characters "けんぽう (Kenpō)" transmitted from the information processing apparatus 1, and calculates related information related to the input. Here, the terminal 4 calculates kana-kanji conversion candidates for the kana characters "けんぽう (Kenpō)" indicated by the input. That is, the terminal 4 calculates kana-kanji conversion candidates peculiar to the terminal 4. Then, the terminal 4 transmits the calculated kana-kanji conversion candidates to the information processing apparatus 1 (*d*4).

The information processing apparatus 1 receives the kana-kanji conversion candidates transmitted from the terminal 4 and displays the received kana-kanji conversion candidates in the vicinity of the input unit 3. With the processing, the information processing apparatus 1 can optimize (personalize) the conversion candidates for the kana-kanji conversion for the user having the terminal 4 by associating the input unit 3 and the terminal 4 using the voice character input device 3B in place of the input unit 3.

A third modification will be described. In FIGS. 3 and 4, the information processing apparatus 1 displays, concerning kana-kanji conversion, the kana-kanji conversion candidates calculated by the terminal 4 associated with the input unit 3 in the vicinity of the input unit 3. However, the embodiment is not limited to the modification, and the information processing apparatus 1 may display, on the terminal 4, the kana-kanji conversion candidates calculated by the terminal 4 associated with the input unit 3. Here, a case of displaying, on a terminal 4, kana-kanji conversion candidates calculated by the terminal 4 associated with an input unit 3 will be described with reference to FIG. 9.

Figure 9:
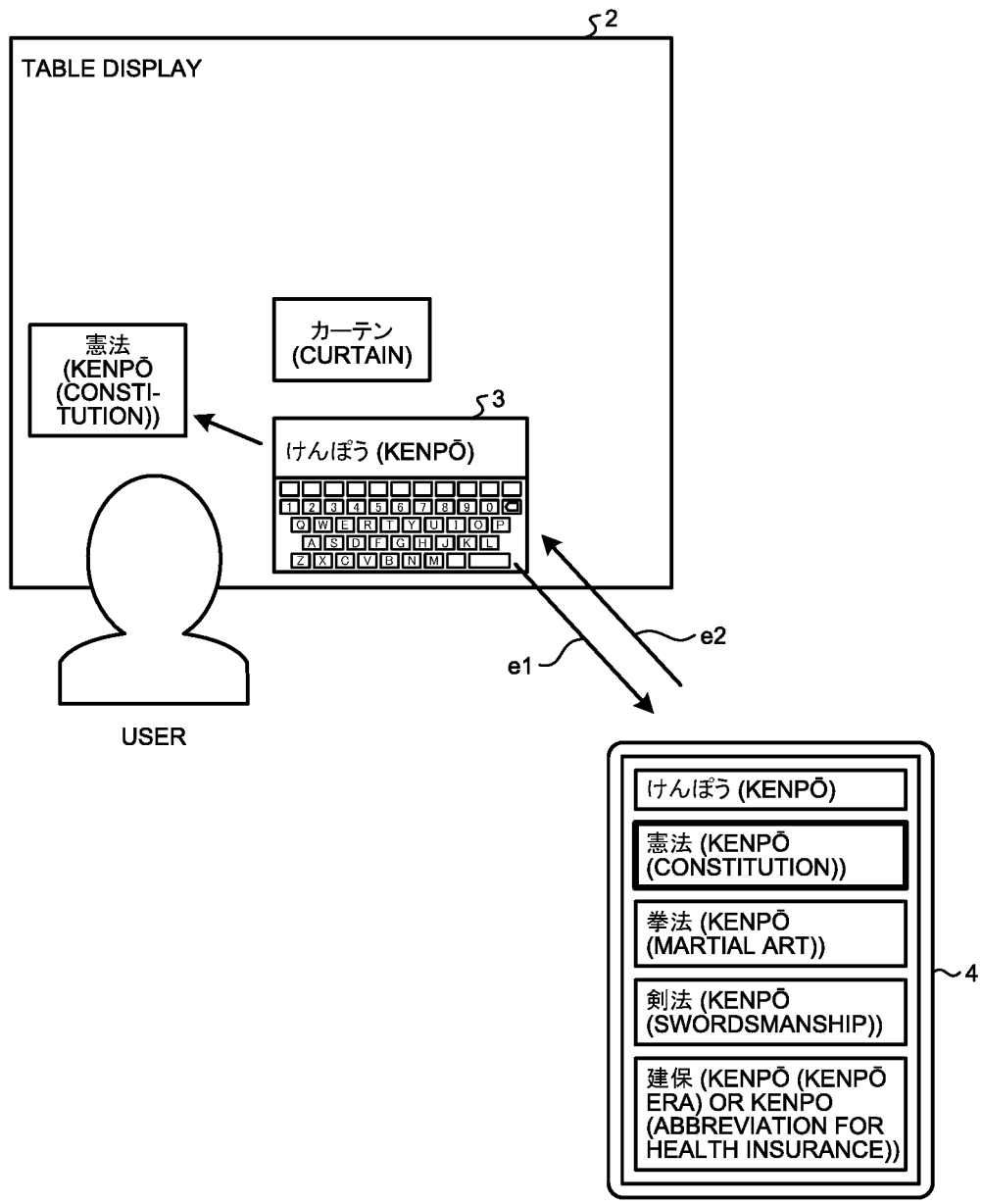
FIG. 9 is a diagram illustrating a third modification of an information processing system according to the first embodiment.

FIG. 9 is a diagram illustrating a third modification of an information processing system according to the first embodiment. In FIG. 9, assuming that a user input kana characters for a focus using the input unit 3, here, assuming that the user inputs "けんぽう (Kenpō)".

Then, the information processing apparatus 1 acquires and transmits the input kana characters "けんぽう (Kenpō)" to the terminal 4 associated with the input unit 3 (e1).

The terminal 4 receives the kana characters "けんぽう (Kenpō)" transmitted from the information processing apparatus 1, and calculates kana-kanji conversion candidates for the kana characters "けんぽう (Kenpō)". Here, kana-kanji conversion candidates "けんぽう (Kenpō), 憲法 (Kenpō (constitution)), 拳法 (Kenpō (martial art)), 剣法 (Kenpō (swordsmanship)), 建保 (Kenpō (Kenpō era) or Kenpo (abbreviation for health insurance))" are calculated in descending order of the frequency of use of the user. Then, the terminal 4 displays the calculated kana-kanji conversion candidates on a display unit 2 of the terminal 4.

After that, the terminal 4 transmits kanji characters selected from the displayed kana-kanji conversion candidates to the information processing apparatus 1 (e2). Here, assuming that "憲法 (Kenpō (constitution))" is selected.

Then, the information processing apparatus 1 receives the "憲法 (Kenpō (constitution))" transmitted from the terminal 4, and inserts "憲法 (Kenpō (constitution))" into a position where a focus of an input area has been detected. With the processing, the information processing apparatus 1 can conceal the information personalized to the user by displaying the kana-kanji conversion candidates on the terminal 4 associated with the input unit 3 in place of the input unit 3.

A fourth modification will be described. In FIG. 9, the information processing apparatus 1 has displayed, concerning kana-kanji conversion, all the kana-kanji conversion candidates calculated by the terminal 4 associated with the input unit 3 on the terminal 4. However, the embodiment is not limited to the modification, and the information processing apparatus 1 may display part of the kana-kanji conversion candidates calculated by the terminal 4 associated with the input unit 3 on the terminal 4 and display another part of the kana-kanji conversion candidates in the vicinity of the input unit 3. Here, a case of displaying part of kana-kanji conversion candidates calculated by a terminal 4 associated with an input unit 3 on the terminal 4 and displaying another part in the vicinity of the input unit 3 will be described with reference to FIG. 10.

Figure 10:
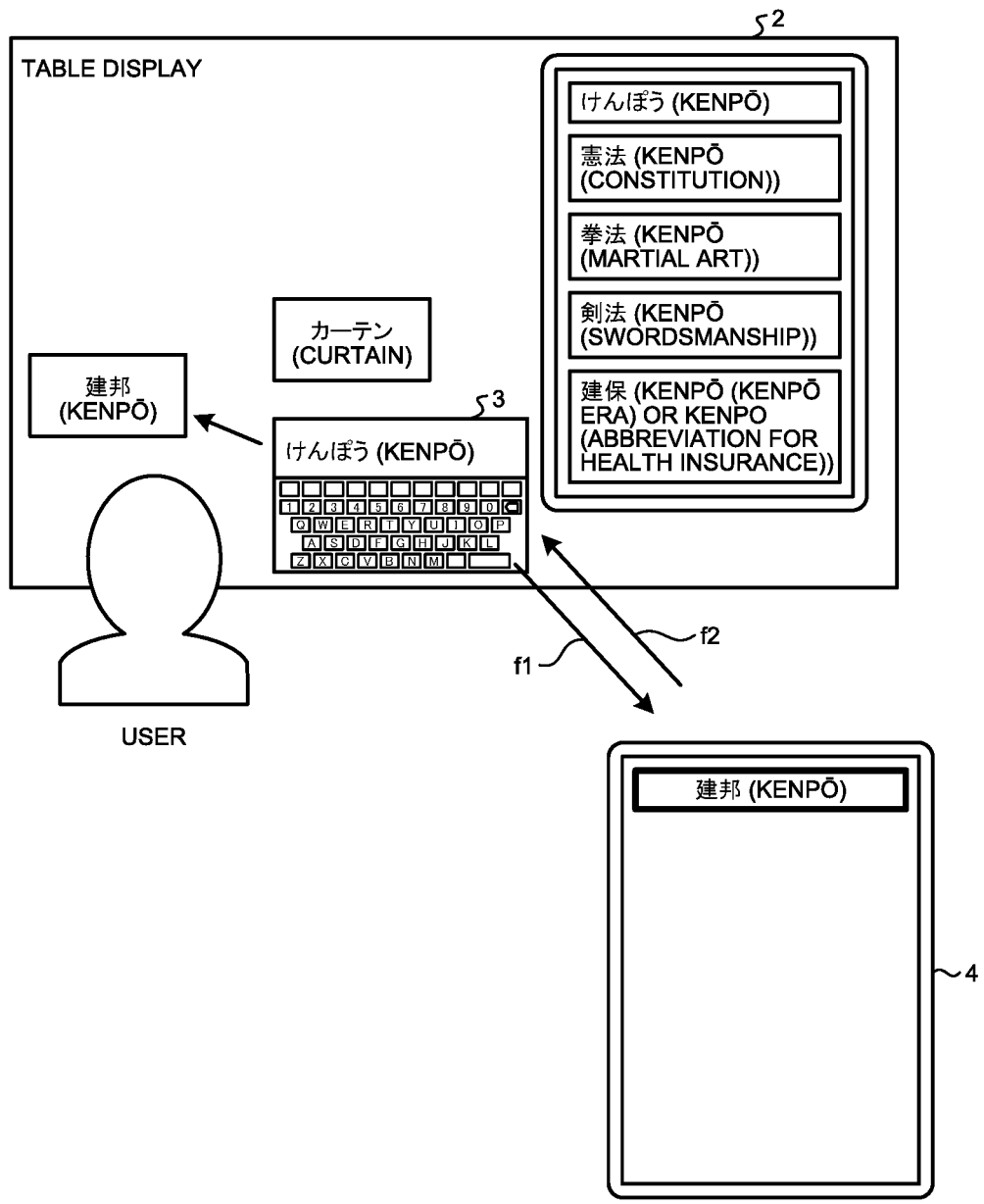
FIG. 10 is a diagram illustrating a fourth modification of an information processing system according to the first embodiment.

FIG. 10 is a diagram illustrating a fourth modification of an information processing system according to the first embodiment. In FIG. 10, assuming that a user input kana characters for a focus using the input unit 3, here, assuming that the user inputs "けんぽう (Kenpō)".

Then, the information processing apparatus 1 acquires the input kana characters "けんぽう (Kenpō)", and calculates kana-kanji conversion candidates for the acquired kana characters "けんぽう (Kenpō)". Here, the information processing apparatus 1 may just calculate kana-kanji conversion candidates for the kana characters using a conversion engine that is not personalized to the user. Then, the information processing apparatus 1 transmits the acquired kana characters "けんぽう (Kenpō)" and the calculated kana-kanji conversion candidates to the terminal 4 associated with the input unit 3 (f1).

The terminal 4 receives the kana characters "けんぽう (Kenpō)" transmitted from the information processing apparatus 1, and calculates kana-kanji conversion candidates for the kana characters "けんぽう (Kenpō)". Here, kana-kanji conversion candidates "けんぽう (Kenpō), 憲法 (Kenpō (constitution)), 拳法 (Kenpō (martial art)), 剣法 (Kenpō (swordsmanship)), 建保 (Kenpō (Kenpō era) or Kenpo (abbreviation for health insurance))" are calculated in descending order of the frequency of use of the user. In addition, the terminal 4 subtracts the kana-kanji conversion candidates transmitted from the information processing apparatus 1 from the kana-kanji conversion candidates calculated by the terminal 4, and displays remaining kana-kanji conversion candidates on a display unit of the terminal 4. That is, the terminal 4 displays only the special Kanji conversion candidates peculiar to the terminal 4. Then, the terminal 4 transmits the kana-kanji conversion candidates transmitted from the information processing apparatus 1 to the information processing apparatus 1 (f2).

The information processing apparatus 1 displays the kana-kanji conversion candidates transmitted from the terminal 4s in the vicinity of the input unit 3. After that, the information processing apparatus 1 inserts kanji characters selected from the kana-kanji conversion candidates displayed in the vicinity of the input unit 3 or kanji characters selected from the kana-kanji conversion candidates displayed on the terminal 4 into a position where a focus on an input area has been detected, for example. With the processing, the information processing apparatus 1 can conceal the information personalized to the user by displaying only the special kana-kanji conversion candidates peculiar to the terminal 4 on the terminal 4 associated with the input unit 3 in place of the input unit 3. For example, the information processing apparatus 1 can conceal personal information such as names and addresses personalized to the user by displaying kana-kanji conversion candidates in the personal information on the terminal 4.

Effect of First Embodiment

As described above, in the first embodiment, the information processing system 9 includes the information processing apparatus 1, the plurality of terminals 4 connected to the information processing apparatus 1, and the display unit 2 connected to the information processing apparatus 1. Then, the display unit 2 is associated with the plurality of input units 3. The information processing apparatus 1 detects the focus on the input area of the display unit 2. The information processing apparatus 1 receives the sensor information output from the terminal 4 held by the user. In the case where the terminal 4 is identified by the received sensor information, the information processing apparatus 1 associates the terminal 4 with the input unit 3 to be used to perform an input to the input area of the detected focus. When acquiring the input to the focus from the input unit 3, the information processing apparatus 1 transmits the acquired input to the terminal 4 associated with the input unit 3. According to the configuration, the information processing apparatus 1 can optimize (personalize) the information related to the input into the information peculiar to the user having the terminal 4 by associating the input unit 3 and the terminal 4 using the sensor of the terminal 4.

Further, in the first embodiment, the terminal 4 acquires the information related to the input peculiar to the terminal 4 using the information held in the terminal 4, and transmits the acquired information to the information processing apparatus 1. The information processing apparatus 1 receives the information related to the input peculiar to the terminal 4 from the terminal 4, and displays the received information in the vicinity of the input unit 3 associated with the terminal 4. According to the configuration, the information processing apparatus 1 can display the information related to the input peculiar to the user having the terminal 4 to the user.

Further, in the first embodiment, the information processing apparatus 1 displays the information related to the input obtained using the information held in the information processing apparatus 1. Then, the terminal 4 displays information obtained by subtracting the information related to the input obtained using the information held in the information processing apparatus 1 from the information related to the input obtained using the information held in the terminal 4. According to the configuration, the information processing apparatus 1 can conceal the information related to the input personalized to the user having the terminal 4.

[b] Second Embodiment

By the way, in the first embodiment, the description that the information processing apparatus 1 transmits the input from the input unit 3 to the terminal 4 after associating the input unit 3 and the terminal 4, and the terminal 4 calculates the related information related to the transmitted input has been given. However, the terminal 4 is not limited to calculating the related information related to the input and may acquire related information calculated by a server.

Therefore, in a second embodiment, a case in which a server connected to the terminal 4 calculates related information related to an input and a terminal 4 acquires the related information calculated by the server will be described.

Configuration of Information Processing System According to Second Embodiment

Figure 11:
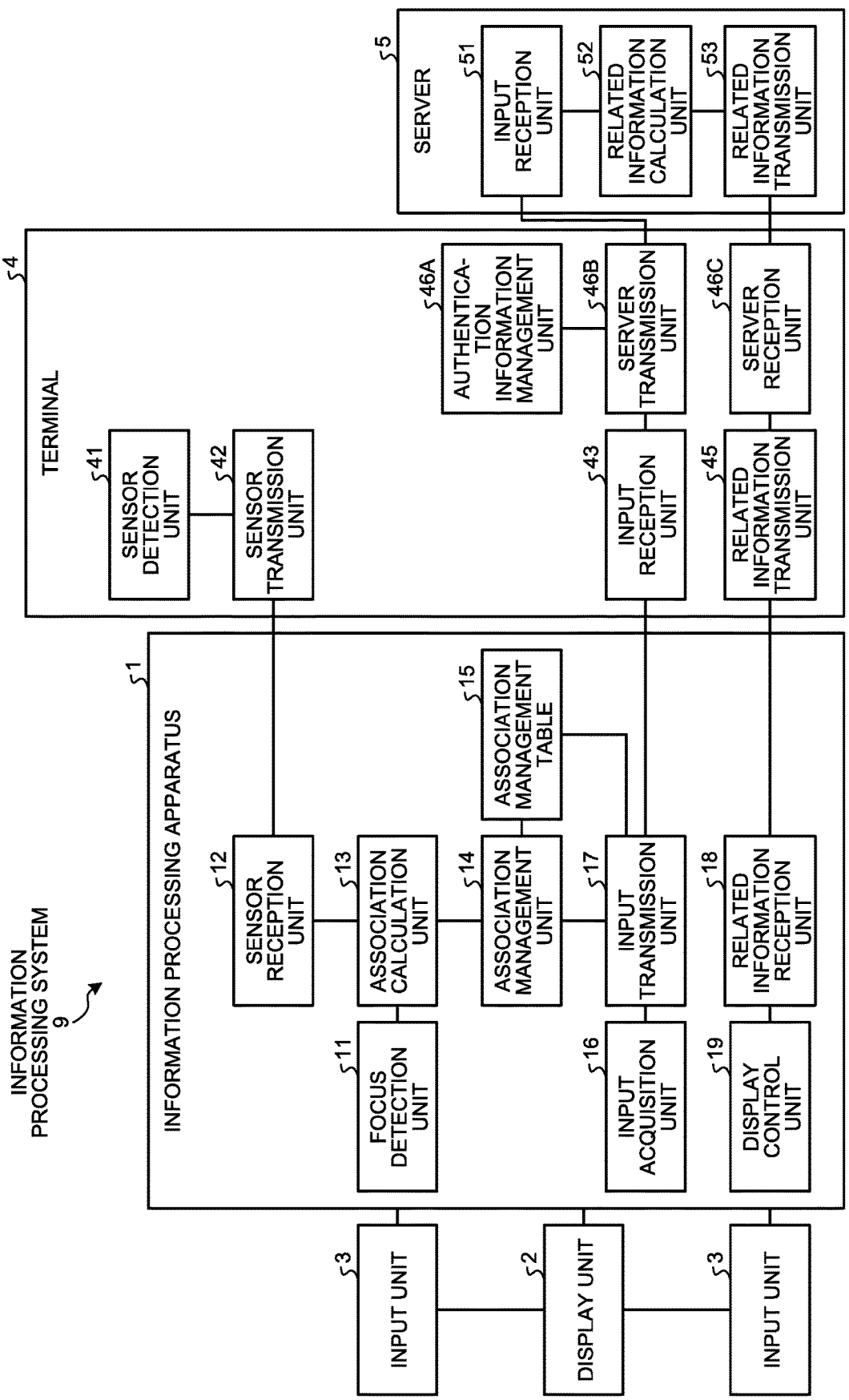
FIG. 11 is a functional block diagram illustrating a configuration of an information processing system according to a second embodiment.

FIG. 11 is a functional block diagram illustrating a configuration of an information processing system according to a second embodiment. Note that the same configuration as that of the information processing system 9 illustrated in FIG. 1 is denoted by the same reference numeral, and duplicate descriptions of the configuration and operation are omitted. A difference between the first and second embodiments is that the related information calculation unit 44 is deleted from the terminal 4 and an authentication information management unit 46A, a server transmission unit 46B, and a server reception unit 46C are added to the terminal 4. Further, a difference between the first and second embodiments is that a server 5 is added. The server 5 includes an input reception unit 51, a related information calculation unit 52, and a related information transmission unit 53.

The authentication information management unit 46A manages authentication information for authenticating a terminal 4.

The server transmission unit 46B transmits an input received by an input reception unit 43 together with the authentication information to the server 5. For example, the server transmission unit 46B transmits kana characters indicated by the input and personal authentication information of the terminal 4 to the server 5.

The server reception unit 46C receives the related information related to the input calculated by the server 5 from the server 5. For example, the server reception unit 46C receives kana-kanji conversion candidate for the kana characters indicated by the input from the server 5.

Then, the server reception unit 46C outputs the related information related to the received input to a related information transmission unit 45. After that, the related information transmission unit 45 transmits the output related information related to the input to an information processing apparatus 1.

The input reception unit 51 receives the input and the authentication information from the terminal 4. For example, the input reception unit 51 receives the kana characters indicated by the input and the personal authentication information of the terminal 4 from the terminal 4.

When the related information calculation unit 52 succeeds in authentication of the terminal 4 using the authentication information received from the terminal 4, the related information calculation unit 52 calculates the related information related to the input received by the input reception unit 51. For example, the related information calculation unit 52 reads the kana-kanji conversion candidates for the kana characters indicated by the input from information personalized to each terminal 4, and rearranges the kanji characters included in the read kana-kanji conversion candidates in descending order of frequency of use. Note that the server 5 manages information personalized to each terminal 4 as to the kana-kanji conversion candidates.

The related information transmission unit 53 transmits the related information related to the input calculated by the related information calculation unit 52 to the terminal 4. For example, the related information transmission unit 53 transmits the kana-kanji conversion candidates for the kana characters indicated by the input and rearranged by the related information calculation unit 52 to the terminal 4.

Case of Acquiring Related Information Related to Input from Server

Figure 12:
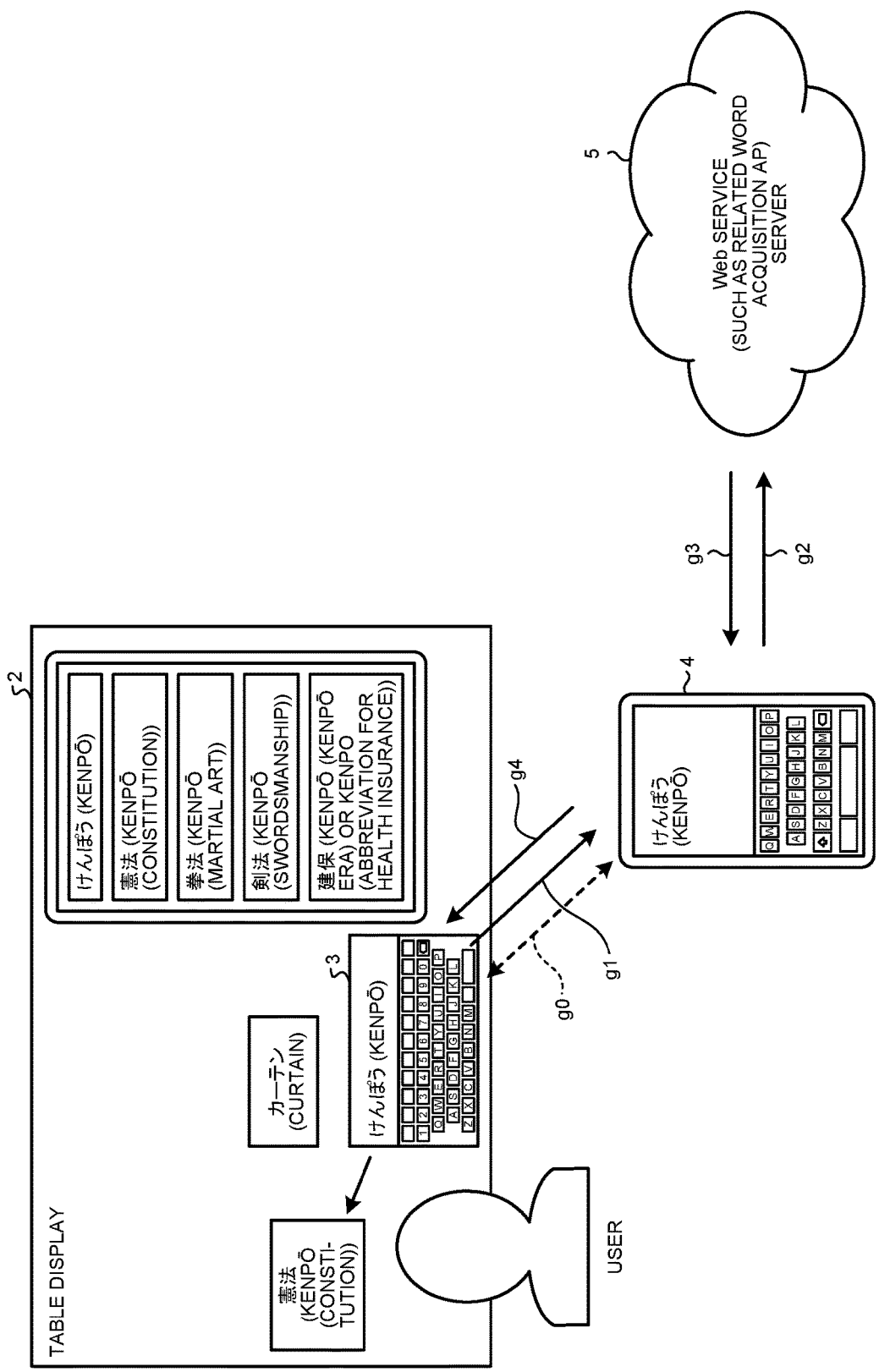
FIG. 12 is a diagram for describing a case of acquiring related information related to an input from a server.

FIG. 12 is a diagram for describing a case of acquiring related information related to an input from a server. Note that, in FIG. 12, an association calculation unit 13 associates the terminal 4 that has output sensor information with an input unit 3, using the sensor information of an acceleration sensor (g0). Assuming that the input unit 3 is a soft keyboard.

A user inputs kana characters for a focus using the input unit 3. Here, assuming that the user inputs "けんぽう (Kenpō)". Then, in the information processing apparatus 1, the input acquisition unit 16 acquires the kana characters "けんぽう (Kenpō)" input from the input unit 3. Then, an input transmission unit 17 transmits the acquired kana characters "けんぽう (Kenpō)" to the terminal 4 having a terminal ID associated with the input unit 3 (g1).

In the terminal 4, the input reception unit 43 receives the kana characters "けんぽう (Kenpō)" transmitted from the information processing apparatus 1. Then, the server transmission unit 46B transmits the received kana characters "けんぽう (Kenpō)" together with the personal authentication information included in the terminal 4 to a web service (g2). Here, the server 5 is an example of the web service.

In the server 5, the related information calculation unit 52 calculates kana-kanji conversion candidates for the kana characters "けんぽう (Kenpō)" indicated by the input. That is, the related information calculation unit 52 calculates kana-kanji conversion candidates peculiar to the terminal 4. As an example, kana-kanji conversion candidates "けんぽう (Kenpō), "憲法 (Kenpō (constitution)), 拳法 (Kenpō (martial art)), "剣法 (Kenpō (swordsmanship)), 建保 (Kenpō (Kenpōera) or Kenpo (abbreviation for health insurance))" are calculated in descending order of the frequency of use of the user. Then, the related information transmission unit 53 transmits the calculated kana-kanji conversion candidates to the terminal 4 (g3).

In the terminal 4, the server reception unit 46C receives the kana-kanji conversion candidates from the server 5, and the related information transmission unit 45 transmits the received kana-kanji conversion candidates to the information processing apparatus 1 (g4).

In the information processing apparatus 1, a related information reception unit 18 receives the kana-kanji conversion candidates transmitted from the terminal 4, and a display control unit 19 displays the received kana-kanji conversion candidates in the vicinity of the input unit 3. With the processing, the information processing apparatus 1 can display the conversion candidates for the kana-kanji conversion converted by the server 5 for the user having the terminal 4 by associating the input unit 3 and the terminal 4 using the sensor of the terminal 4.

Effect of Second Embodiment

In this manner, in the second embodiment, the terminal 4 acquires the information related to the input peculiar to the terminal 4 from the server 5, and transmits the acquired information to the information processing apparatus 1. The information processing apparatus 1 receives the information related to the input peculiar to the terminal 4 from the terminal 4, and displays the received information in the vicinity of the input unit 3 associated with the terminal 4. According to the configuration, the information processing apparatus 1 can display the information related to the input acquired from the server 5 for the user having the terminal 4.

[c] Third Embodiment

By the way, in the first embodiment, the description that the information processing apparatus 1 transmits the input from the input unit 3 to the terminal 4 after associating the input unit 3 and the terminal 4, and the terminal 4 calculates the related information related to the transmitted input has been given. However, the terminal 4 is not limited to calculating the related information related to the input, and the information processing apparatus 1 may calculate the related information related to the input, using a learning dictionary related to the input of the terminal 4.

Therefore, in the third embodiment, a case in which an information processing apparatus 1 calculates related information related to an input of a terminal 4, using a learning dictionary related to the input, will be described.

Configuration of Information Processing System According to Third Embodiment

Figure 13:
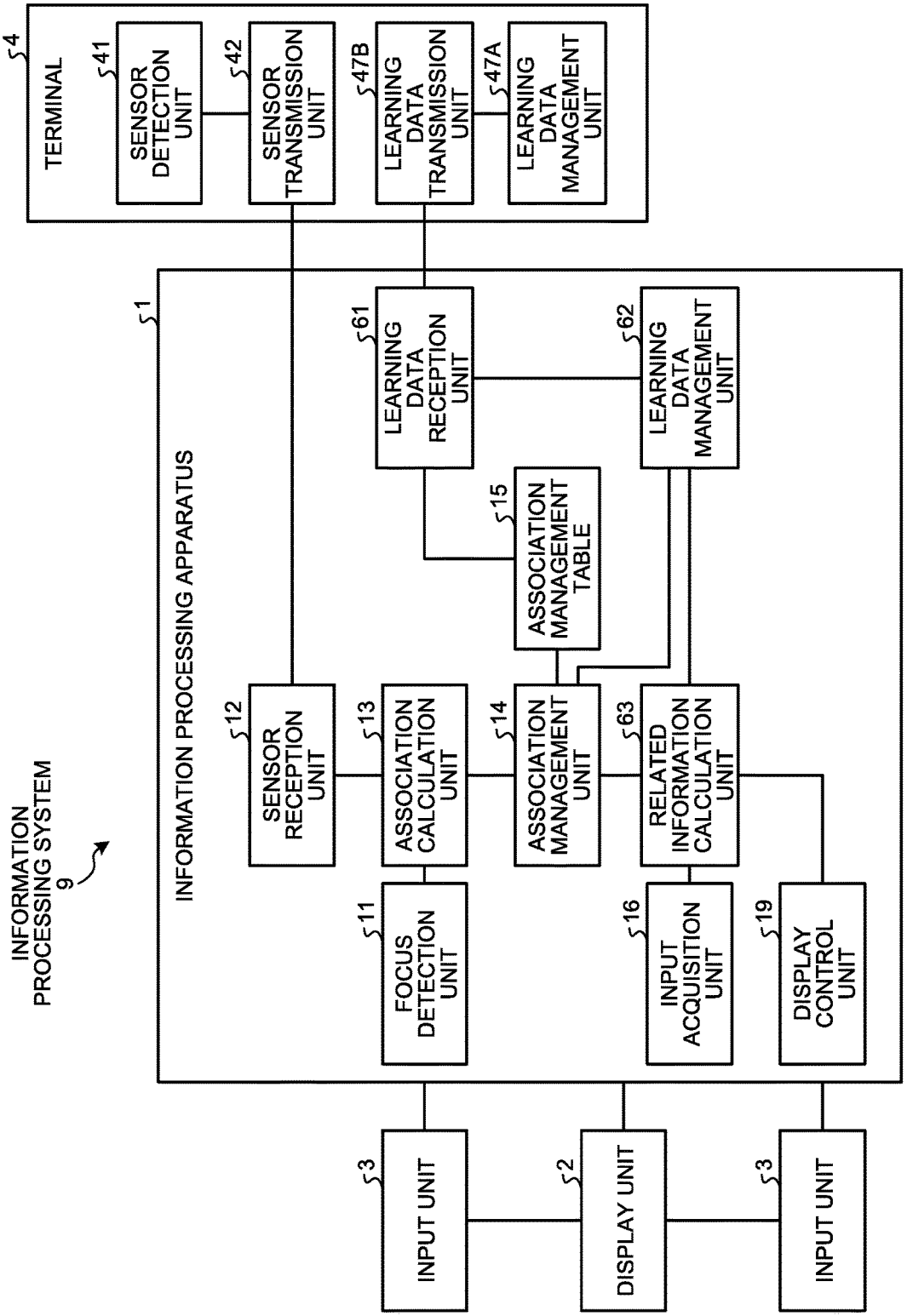
FIG. 13 is a functional block diagram illustrating a configuration of an information processing system according to a third embodiment.

FIG. 13 is a functional block diagram illustrating a configuration of an information processing system according to a third embodiment. Note that the same configuration as that of the information processing system 9 illustrated in FIG. 1 is denoted by the same reference numeral, and duplicate descriptions of the configuration and operation are omitted. A difference between the first and third embodiments is that the input reception unit 43, the related information calculation unit 44, and the related information transmission unit 45 are deleted from the terminal 4 and a learning data transmission unit 47B and a learning data management unit 47A are added to the terminal 4. Further, a difference between the first and third embodiments is that the input transmission unit 17 and the related information reception unit 18 are deleted from the information processing apparatus 1 and a learning data reception unit 61, a learning data management unit 62, and a related information calculation unit 63 are added to the information processing apparatus 1.

The learning data reception unit 61 requests the terminal 4 to send a learning dictionary related to an input, and receives the learning dictionary related to the input from the terminal 4 as a result of the request. For example, when association between the terminal 4 and an input unit 3 is managed by an association management unit 14, the learning data reception unit 61 requests the terminal 4 to send a learning dictionary for kana-kanji conversion. Then, as a result of the request, the learning data reception unit 61 receives the learning dictionary for kana-kanji conversion from the terminal 4.

The learning data management unit 62 manages the learning dictionary related to the input received by the learning data reception unit 61. For example, the learning data management unit 62 manages the learning dictionary for kana-kanji conversion received by the learning data reception unit 61 in association with the terminal 4.

The related information calculation unit 63 calculates related information related to an input acquired by an input acquisition unit 16. For example, the related information calculation unit 63 refers to an association management table 15, and acquires a terminal ID 15*b* of the terminal 4 associated with the input unit 3 to which the input acquired by the input acquisition unit 16 is input. The related information calculation unit 63 calculates kana-kanji conversion candidates for kana characters indicated by the input, using the learning dictionary of kana-kanji conversion associated with the terminal 4 indicated by the terminal ID 15*b* and managed by the learning data management unit 62. As an example, the related information calculation unit 63 reads kana-kanji conversion candidates for the kana characters indicated by input from the learning dictionary of kana-kanji conversion, and rearranges kanji characters included in the read kana-kanji conversion candidates in descending order of frequency of use of a user.

The learning data management unit 47A manages the learning dictionary related to the input peculiar to the terminal 4. For example, the learning data management unit 47A holds the learning dictionary for kana-kanji conversion peculiar to the terminal 4.

When the learning dictionary related to an input is requested from the information processing apparatus 1, the learning data transmission unit 47B transmits the learning dictionary related to the requested input to the information processing apparatus 1. For example, when the learning dictionary for kana-kanji conversion is requested from the information processing apparatus 1, the learning data transmission unit 47B transmits the learning dictionary for kana-kanji conversion held in the terminal 4 to the information processing apparatus 1.

Figure 14:
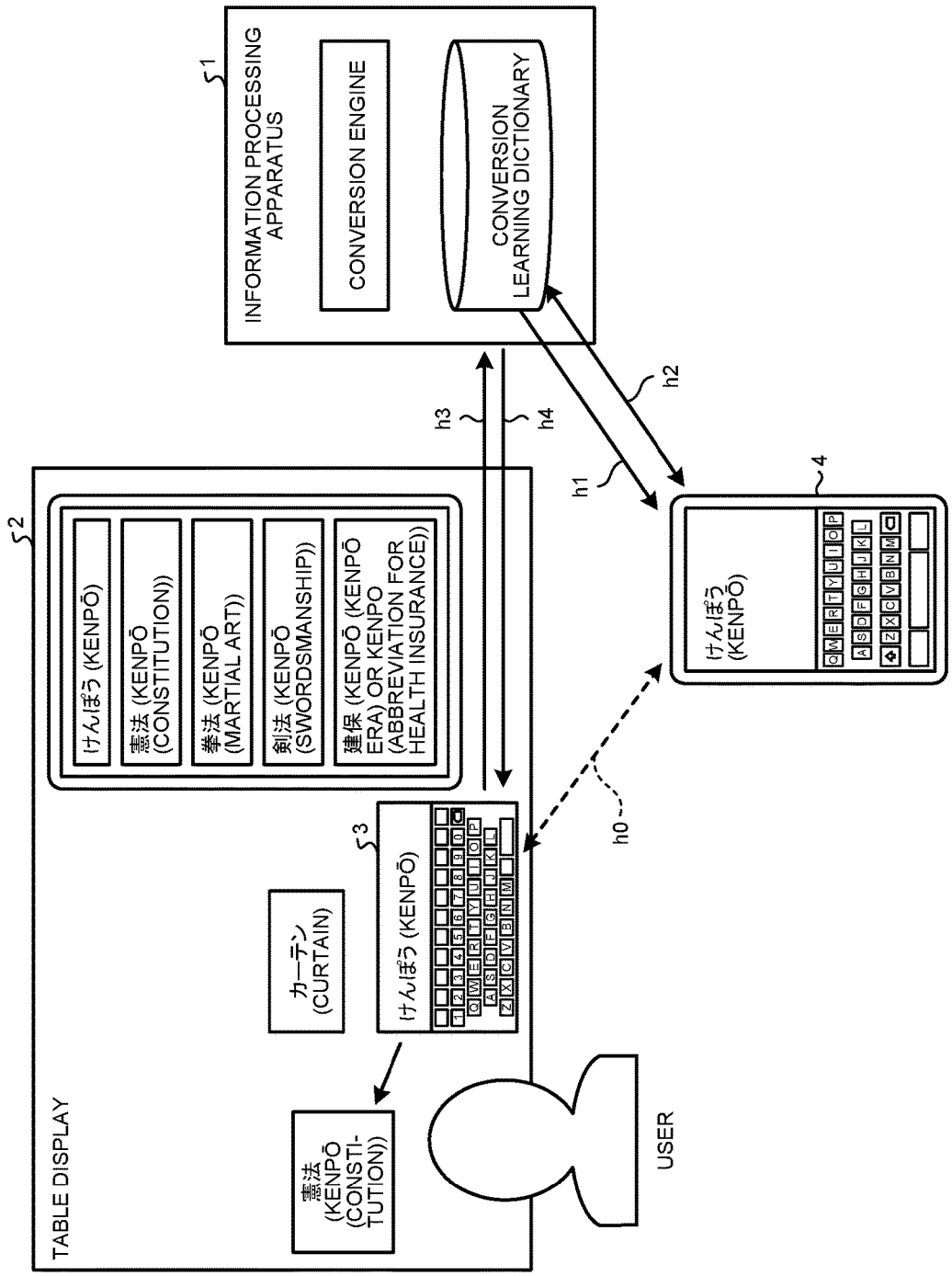
FIG. 14 is a diagram for describing a case where an information processing apparatus calculates related information related to an input.

Case where Information Processing Apparatus Calculates Related Information Related to Input FIG. 14 is a diagram for describing a case where an information processing apparatus 1 calculates related information related to an input. Note that, in FIG. 14, an association calculation unit 13 associates the terminal 4 that has output the sensor information with the input unit 3, using sensor information of an acceleration sensor. Assuming that the input unit 3 is a soft keyboard.

When the terminal 4 and the input unit 3 are associated (h0), in the information processing apparatus 1, the learning data reception unit 61 requests the associated terminal 4 to send the learning dictionary for kana-kanji conversion (h1). Then, the learning data reception unit 61 receives the learning dictionary for kana-kanji conversion from the terminal 4 (*h*2), and manages the learning dictionary for kana-kanji conversion and the terminal 4 in association with each other.

Next, the user inputs kana characters for a focus using the input unit 3. Here, assuming that the user inputs "けんぽう (Kenpō)". Then, in the information processing apparatus 1, the input acquisition unit 16 acquires the kana characters "けんぽう (Kenpō)" input from the input unit 3 (h3). Then, the related information calculation unit 63 calculates kana-kanji conversion candidates for the kana characters "けんぽう (Kenpō)" indicated by the input using the learning dictionary and a conversion engine of kana-kanji conversion of the terminal 4 associated with the input unit 3. That is, the related information calculation unit 63 calculates kana-kanji conversion candidates peculiar to the terminal 4. As an example, kana-kanji conversion candidates "けんぽう (Kenpō), 憲法 (Kenpō (constitution)), 拳法 (Kenpō (martial art)), 剣法 (Kenpō (swordsmanship)), 建保 (Kenpō (Kenpō era) or Kenpo (abbreviation for health insurance))" are calculated in descending order of the frequency of use of the user.

Then, a display control unit 19 displays the calculated kana-kanji conversion candidates in the vicinity of the input unit 3 (h4). With the processing, the information processing apparatus 1 can calculate the conversion candidates for the kana-kanji conversion for the kana characters input to the input unit 3, using the learning dictionary of kana-kanji conversion of the terminal 4, by associating the input unit 3 and the terminal 4 using the sensor of the terminal 4. As a result, the information processing apparatus 1 can display the calculated result to the user having the terminal 4.

Effect of Third Embodiment

In this manner, in the third embodiment, the terminal 4 transmits the learning dictionary related to the input peculiar to the terminal 4 to the information processing apparatus 1. The information processing apparatus 1 acquires the information related to the input peculiar to the terminal 4, using the learning dictionary transmitted from the terminal 4, and displays the acquired information in the vicinity of the input unit 3 associated with the terminal 4. According to the configuration, the information processing apparatus 1 can calculate the information related to the input, using the learning dictionary related to the input of the terminal 4, and can display the calculated result to the user having the terminal 4.

Note that the description has been given on the assumption that the first to third embodiments are applied to the space UI. However, application of the first to third embodiments is not limited thereto and the first to third embodiments can be applied to digital signage or the like. For example, the first to third embodiments can be applied to a case in which the display unit 2 connected to the information processing apparatus 1 is displayed on a predetermined place and the user having each terminal 4 inputs a keyword of desired information to the input unit 3 displayed on the display unit 2. The predetermined place may be any place such as a storefront, a public facility, a transportation facility, or the like.

Others

Note that the information processing apparatus 1 can be realized by mounting the display unit 2, the input unit 3, the functional units 11 to 19, and the like on an information processing apparatus such as a known personal computer, workstation, or the like.

In addition, the illustrated constituent elements of the apparatus are not always physically configured as illustrated in the drawing. That is, the specific aspects of distribution/integration of the apparatus are not limited to those illustrated, and all or a part thereof may be functionally or physically distributed or integrated in arbitrary units according to various loads and use situations. For example, the association calculation unit 13 and the association management unit 14 may be integrated as one unit.

Figure 15:
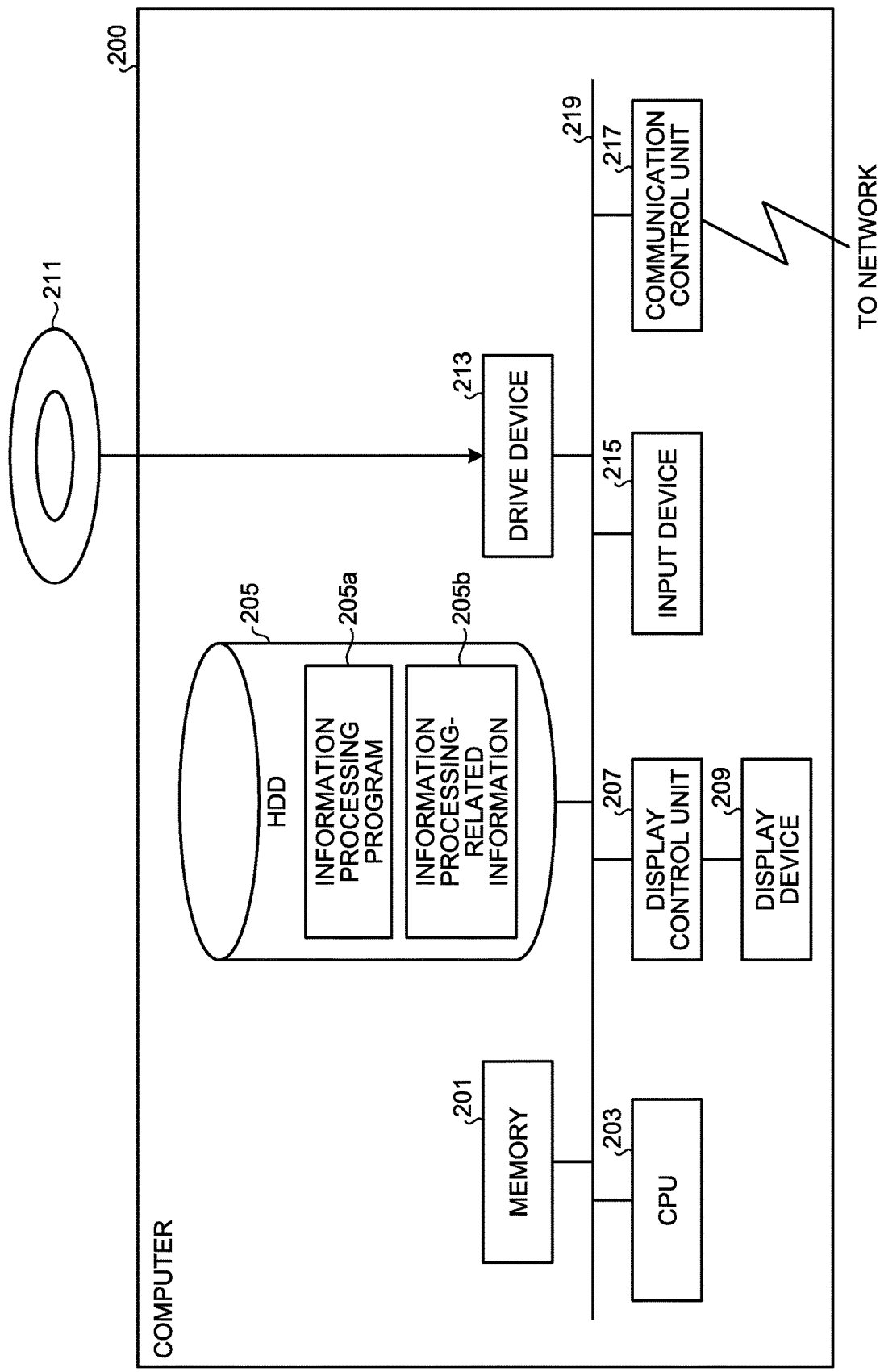
FIG. 15 is a diagram illustrating an example of a computer that executes an information processing program.

Further, the various types of processing described in the above embodiments can be realized by executing a program prepared in advance on a computer such as a personal computer or a workstation. Therefore, hereinafter, an example of a computer that executes an information processing program that realizes the same functions as the information processing apparatus 1 illustrated in FIG. 1 will be described. FIG. 15 is a diagram illustrating an example of a computer that executes an information processing program.

As illustrated in FIG. 15, a computer 200 has a CPU 203 that executes various types of arithmetic processing, an input device 215 that accepts inputs of data from a user, and a display control unit 207 that controls a display device 209. Further, the computer 200 includes a drive device 213 that reads a program and the like from a storage medium, and a communication control unit 217 that exchanges data with another computer via a network. Further, the computer 200 includes a memory 201 that temporarily stores various kinds of information, and an HDD 205. Then, the memory 201, the CPU 203, the HDD 205, the display control unit 207, the drive device 213, the input device 215, and the communication control unit 217 are connected via a bus 219.

The drive device 213 is, for example, a device for a removable disk 211.

The CPU 203 reads an information processing program 205a, expands the program in the memory 201, and executes the program as a process. This process corresponds to each function unit of the information processing apparatus 1. Information processing-related information 205b corresponds to the information such as the association management table 15 stored in the storage unit (not illustrated) of the information processing apparatus 1. Then, for example, the removable disk 211 stores various types of information such as the information processing program 205a.

Note that the information processing program 205a does not need to be stored in the HDD 205 from the beginning. For example, the program is stored in "portable physical medium" such as a flexible disk (FD), a CD-ROM, a DVD disk, a magneto-optical disk, or an IC card inserted into the computer 200. Then, the computer 200 may read and execute the information processing program 205a from the portable physical medium.

According to one aspect, in a case where a plurality of users performs an input operation to a common screen using a soft keyboard, the input operation can be personalized to each of the plurality of users.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
   an information processing apparatus;
   a display formed on an object external to the information processing apparatus and controlled by the information processing apparatus; and terminals connected to the information processing apparatus wherein users respectively having the terminals, wherein the information processing apparatus includes a first memory and a first processor coupled to the first memory, the first processor being configured to execute a first process including:

displaying on the display soft keyboards to be respectively used by the users, associating the soft keyboards respectively with the terminals of the users in a correspondence storage unit, specifying, when a first character string is input from a soft keyboard, a terminal from among the terminals that corresponds to the soft keyboard by referring to the correspondence storage unit, transmitting the first character string to the terminal, receiving from the terminal information that is related to the first character string personalized according to information held in the terminal, and displaying within the display the received information in an area that does not overlap with the soft keyboard associated with the terminal.

2. The information processing system according to claim 1, wherein the terminal includes a second memory and a second processor coupled to the second memory, the second processor executing a second process including acquiring the information related to the first character string peculiar to the terminal, using the information held in the terminal, and transmitting the acquired information to the information processing apparatus.

3. The information processing system according to claim 1, wherein the terminal includes a second memory and a second processor coupled to the second memory, the second processor executing a second process including acquiring the information related to the first character string peculiar to the terminal from a web service, and transmitting the acquired information to the information processing apparatus.

4. The information processing system according to claim 1, wherein the terminal includes a second memory and a second processor coupled to the second memory, the second processor executing a second process including transmitting a learning dictionary related to the first character string peculiar to the terminal to the information processing apparatus, and the first process further includes acquiring the information related to the first character string peculiar to the terminal, using the learning dictionary transmitted from the terminal, and displaying the acquired information in an area that does not overlap with the soft keyboard associated with the terminal.

5. The information processing system according to claim 1, wherein the first process further includes displaying first information related to the first character string obtained using the information held in the information processing apparatus, and the terminal includes a second memory and a second processor coupled to the second memory, the second processor executing a second process including displaying on a display of the terminal second information obtained by subtracting the first information from information related to the first character string obtained using the information held in the terminal.

6. The information processing system according to claim 2, wherein the information relating to the first character string is information of a conversion candidate of the first character string.

7. The information processing system according to claim 3, wherein the information relating to the first character string is information of a conversion candidate of the first character string.

8. The information processing system according to claim 4, wherein the information relating to the first character string is information of a conversion candidate of the first character string.

9. The information processing system according to claim 5, wherein the information relating to the first character string is information of a conversion candidate of the first character string.

10. An information processing apparatus comprising:

a processor; and a memory, wherein the processor executes:

specifying, when a first character string is input from a soft keyboard, a terminal that is associated with the soft keyboard by referring to a correspondence storage unit that stores therein correspondence between a soft keyboard among soft keyboards and a terminal among terminals wherein the soft keyboards are displayed on a display that is formed on an object external to the information processing apparatus, controlled by the information processing apparatus and respectively used by users who respectively have the terminals that are connected to the information processing apparatus, transmitting the first character string to the terminal, receiving from the terminal information that is related to the first character string personalized according to information help in the terminal, and displaying within the display the received information in an area that does not overlap with the soft keyboard associated with the terminal.

11. An information processing method performed by a computer with instructions, the method, by a processor executing the instructions, comprising:

specifying, when a first character string is input from a soft keyboard, a terminal that is associated with the soft keyboard by referring to a correspondence storage unit that stores therein correspondence between a soft keyboard among soft keyboards and a terminal among terminals wherein the soft keyboards are displayed on a display that is formed on an object external to the computer, controlled by the computer and respectively used by users who respectively have the terminals that are connected to the computer, transmitting the first character string to the terminal, receiving from the terminal information that is related to the first character string personalized according to information held in the terminal, and displaying within the display the received information in an area that does not overlap with the soft keyboard associated with the terminal.

* * * * *